US011101880B1

(12) United States Patent
Gong

(10) Patent No.: US 11,101,880 B1
(45) Date of Patent: Aug. 24, 2021

(54) WIDE/MULTIBAND WAVEGUIDE ADAPTER FOR COMMUNICATIONS SYSTEMS

(71) Applicant: Amazon Technologies, Inc., Seattle, WA (US)

(72) Inventor: Liang Gong, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/820,318

(22) Filed: Mar. 16, 2020

(51) Int. Cl.
*H01Q 13/02* (2006.01)
*H01Q 5/00* (2015.01)
*H04B 7/185* (2006.01)
*H01Q 1/28* (2006.01)

(52) U.S. Cl.
CPC ......... *H04B 7/18515* (2013.01); *H01Q 1/288* (2013.01)

(58) Field of Classification Search
CPC .. H01P 1/16; H01P 1/161; H01P 1/162; H01P 1/2133; H01P 1/2138; H01P 3/127; H01P 5/082; H01P 5/20; H01P 1/17; H01P 1/173; H01P 5/024; H01P 5/103; G01S 13/4409; G01S 13/4481; H01Q 13/0208; H01Q 13/0258; H01Q 13/10; H01Q 19/13; H01Q 25/02; H01Q 3/08; H01Q 25/04
USPC ....... 455/12.1; 333/122, 113, 135, 137, 208; 343/785, 786, 727, 776, 761; 342/153
See application file for complete search history.

(56) References Cited

U.S. PATENT DOCUMENTS

| 3,778,838 | A | * | 12/1973 | Clavin | .................. | H01Q 13/18 |
| | | | | | | 343/727 |
| 3,986,188 | A | * | 10/1976 | True | .......................... | G01S 7/38 |
| | | | | | | 342/14 |
| 4,228,410 | A | * | 10/1980 | Goudey | .................... | H01P 1/17 |
| | | | | | | 333/122 |
| 4,301,347 | A | * | 11/1981 | Quine | ..................... | H05B 6/74 |
| | | | | | | 219/747 |
| 4,420,756 | A | * | 12/1983 | Hamada | ................... | H01P 1/16 |
| | | | | | | 333/122 |

(Continued)

OTHER PUBLICATIONS

Mohamed A. Abdelaal, et al.; Ka-Band 3-D-Printed Wideband Groove Gap Waveguide Orthomode Transducer, IEEE Transactions on Microwave Theory and Techniques, vol. 67, No. 8, Aug. 2019, 9 pages.

(Continued)

*Primary Examiner* — Tan H Trinh
(74) *Attorney, Agent, or Firm* — Kilpatrick Townsend & Stockton, LLP

(57) ABSTRACT

A waveguide adapter for, e.g., a wideband or multiband communication feeder assembly can include first and second waveguides for carrying polarized signals. A first turnstile junction is connected with the first waveguide, configured to convert the first polarized signal from the first waveguide into linearly polarized signals that can be passed along linear waveguides. Each one of the linear waveguides has a common effective length, and the linear waveguides diverge from the first turnstile junction and converge at a second turnstile junction operably connected with the second circular waveguide. The linear waveguides can be flexible or rigid, and can be bent to accommodate routing around various components of the communication system, as well as to facilitate a change in orientation as between the second waveguide and the first waveguide.

20 Claims, 13 Drawing Sheets

(56) References Cited

U.S. PATENT DOCUMENTS

| | | | | |
|---|---|---|---|---|
| 4,460,898 A * | 7/1984 | Silinsky | | H01Q 25/02 |
| | | | | 342/153 |
| 5,410,318 A * | 4/1995 | Wong | | H01P 1/16 |
| | | | | 333/113 |
| 5,870,060 A * | 2/1999 | Chen | | H01Q 3/20 |
| | | | | 343/761 |
| 6,111,547 A * | 8/2000 | Gau | | H01Q 1/247 |
| | | | | 343/776 |
| 2002/0175875 A1* | 11/2002 | Verstraeten | | H01Q 5/47 |
| | | | | 343/786 |
| 2003/0117243 A1* | 6/2003 | Cooper | | H01P 1/207 |
| | | | | 333/208 |
| 2005/0213863 A1* | 9/2005 | Sugiyama | | G02F 1/2255 |
| | | | | 385/2 |
| 2011/0254640 A1* | 10/2011 | Gehring | | H01P 1/162 |
| | | | | 333/137 |
| 2012/0229232 A1* | 9/2012 | Mahon | | H01P 1/162 |
| | | | | 333/21 A |
| 2013/0088307 A1* | 4/2013 | Dousset | | H01P 1/161 |
| | | | | 333/137 |
| 2013/0307719 A1* | 11/2013 | Granet | | H01P 1/161 |
| | | | | 342/153 |
| 2013/0342282 A1* | 12/2013 | Uher | | H01P 1/2131 |
| | | | | 333/135 |
| 2015/0097747 A1* | 4/2015 | Hwang | | H01Q 13/0208 |
| | | | | 343/785 |
| 2015/0117867 A1* | 4/2015 | Sugiyama | | G02F 1/225 |
| | | | | 398/182 |
| 2016/0134004 A1* | 5/2016 | Haluba | | H01Q 13/02 |
| | | | | 455/12.1 |
| 2016/0248164 A1* | 8/2016 | Fonseca | | H01P 5/19 |
| 2019/0196107 A1* | 6/2019 | Sakr | | G02B 6/4291 |
| 2020/0136220 A1* | 4/2020 | Ravanelli | | H01P 1/173 |

OTHER PUBLICATIONS

Sudhakar Rao, et al., Circular Polarization Feed with Dual-Frequency OMT-Based Turnstile Junction, Antenna Applications, IEEE Antennas and Propagation Magazine, vol. 53, No. 1, Feb. 2011, 11 pages.

Richard Roberts, et al., Q/V-Band Feed System Development, 5 pages.

Doug Henke, et al., Minimizing RF Performance Spikes in a Cryogenic Orthomode Transducer (OMT), IEEE Transactions on Microwave Theory and Techniques, vol. 62, No. 4, Apr. 2014, 11 pages.

Juan Luis Cano, et al., Wideband Dual-Mode Waveguide Bends for Linear and Circular Polarizations, IEEE Transactions on Microwave Theory and Techniques, vol. 65, No. 3, Mar. 2017, 7 pages.

* cited by examiner

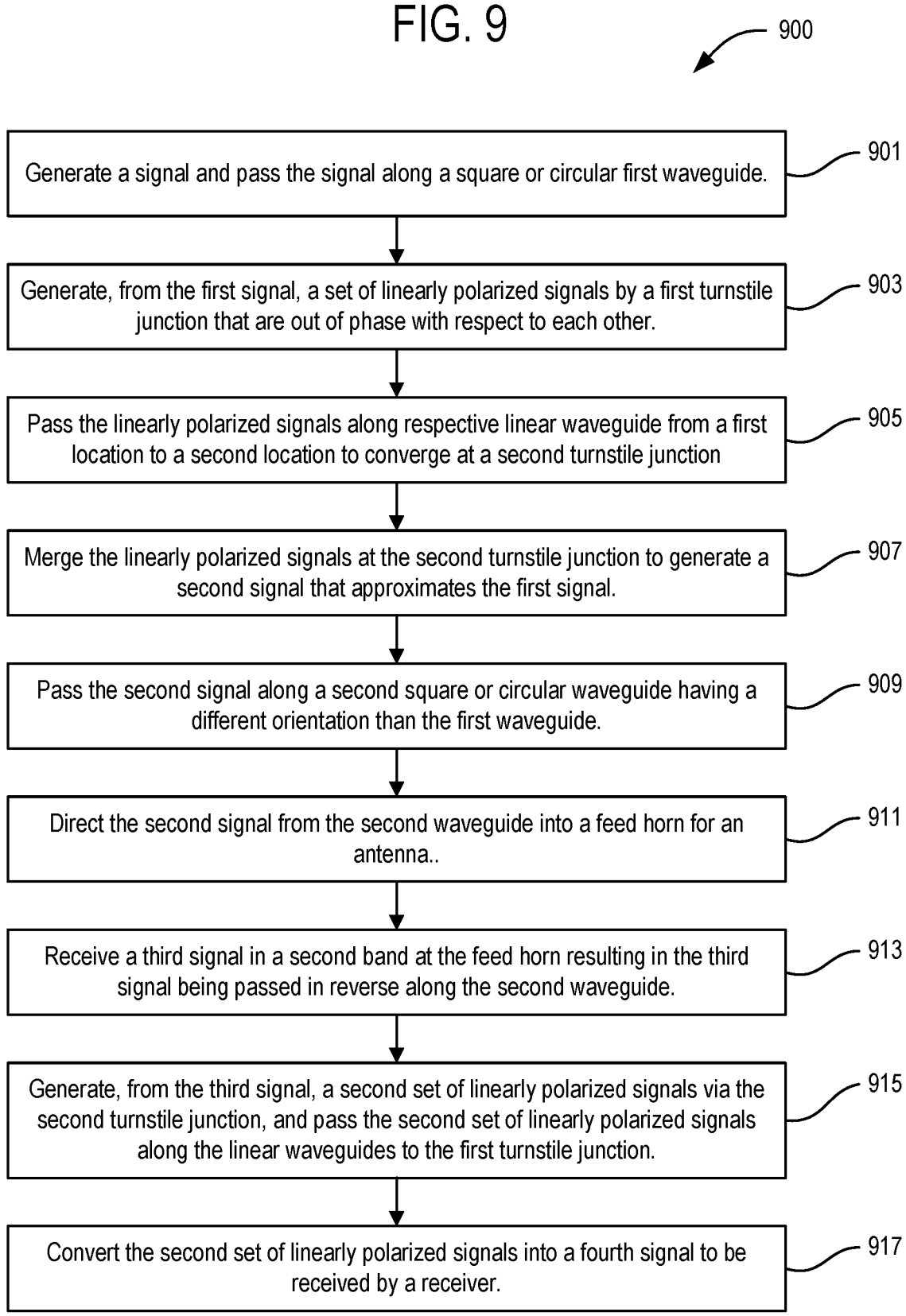

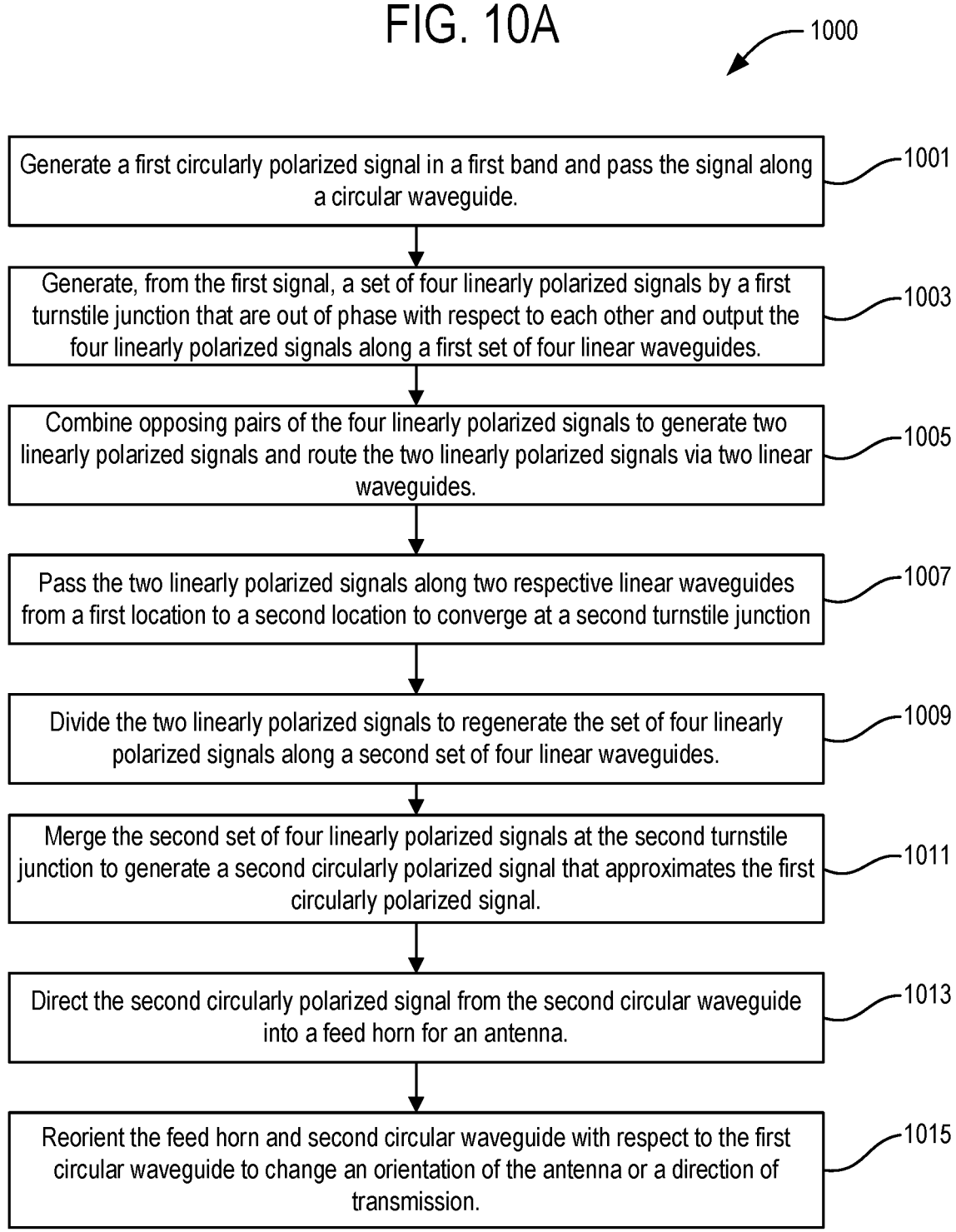

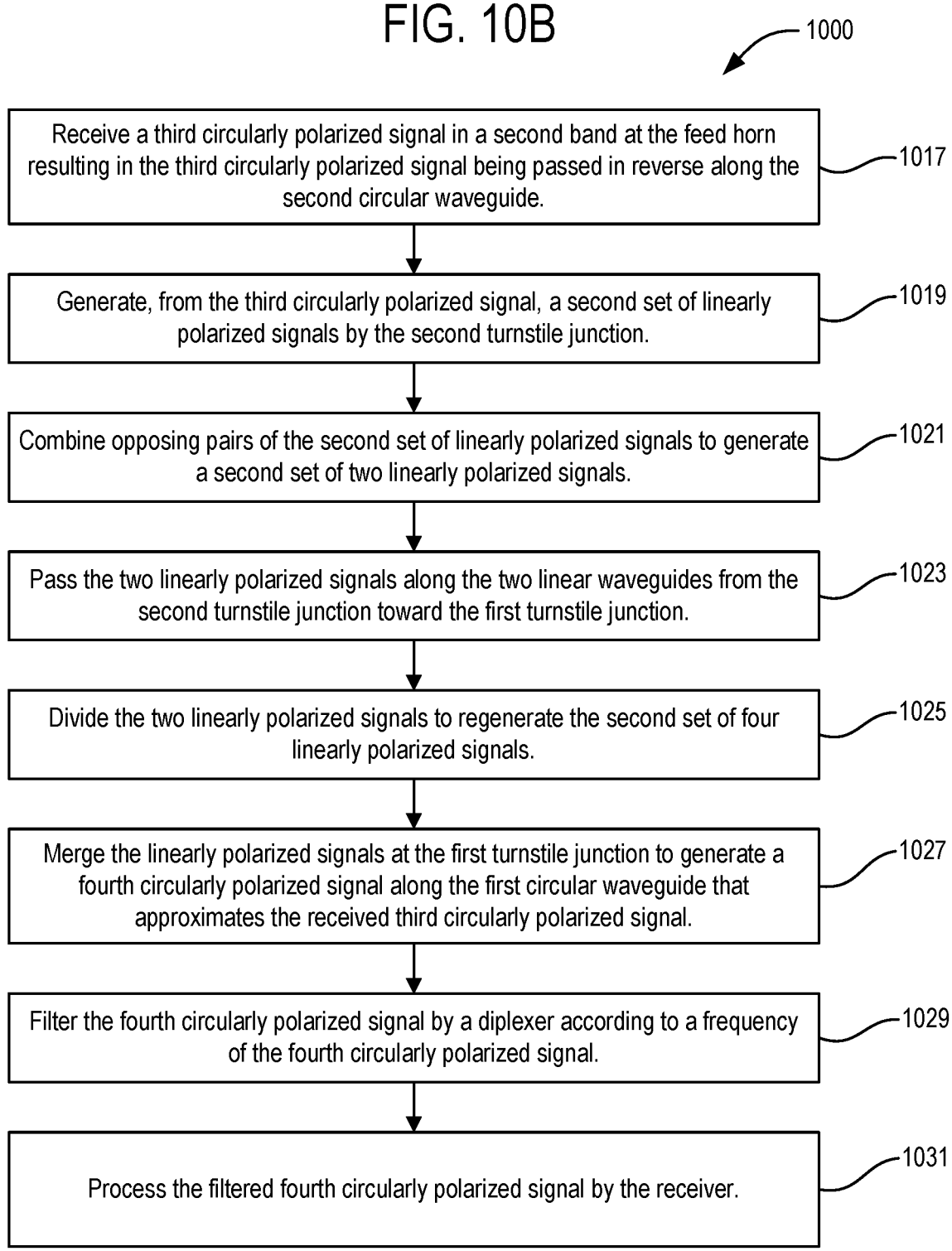

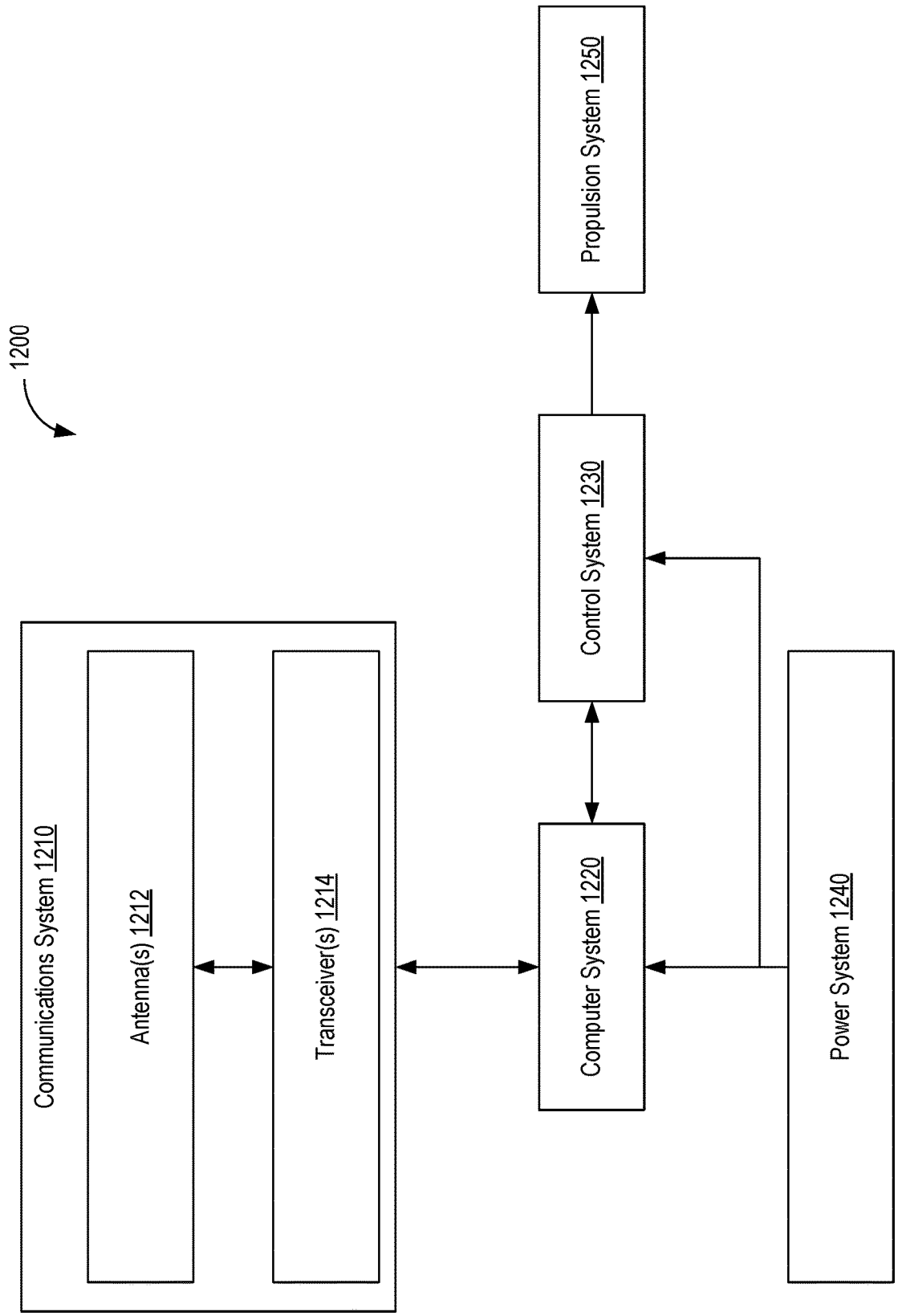

WIDE/MULTIBAND WAVEGUIDE ADAPTER FOR COMMUNICATIONS SYSTEMS

BACKGROUND

Wireless communication systems, such as satellite communication systems, include signal collecting and/or transmitting hardware such as a physical dish or antenna, signal processing hardware that can generate signal waveforms for transmission or can decode received transmissions into data, and signal feeding hardware for transferring electromagnetic signals between the two. In any such communication system, a signal must be transferred from the signal processing hardware to the transmitting hardware, or from the signal collecting hardware to the signal processing hardware with high fidelity and minimal insertion loss. However, geometric constraints can inhibit the use of optimal signal feeding hardware for communication systems. New approaches are therefore warranted to reduce the size and improve the geometric flexibility of signal feeding hardware for communication systems, and particularly for satellite communication systems.

BRIEF DESCRIPTION OF THE DRAWINGS

Various embodiments in accordance with the present disclosure will be described with reference to the drawings, in which:

FIG. 9 illustrates an example of a process flow for passing circularly polarized signals to and from an antenna of a communication system, according to embodiments of the present disclosure;

FIG. 10A illustrates an example of a second process flow for passing circularly polarized signals to and from an antenna of a communication system, according to embodiments of the present disclosure;

FIG. 10B continues the example process flow of FIG. 10A for passing circularly polarized signals to and from an antenna of a communication system, according to embodiments of the present disclosure;

FIG. 12 illustrates an example of components of a computer system that can belong to a satellite, according to embodiments of the present disclosure.

DETAILED DESCRIPTION

Figure 1:
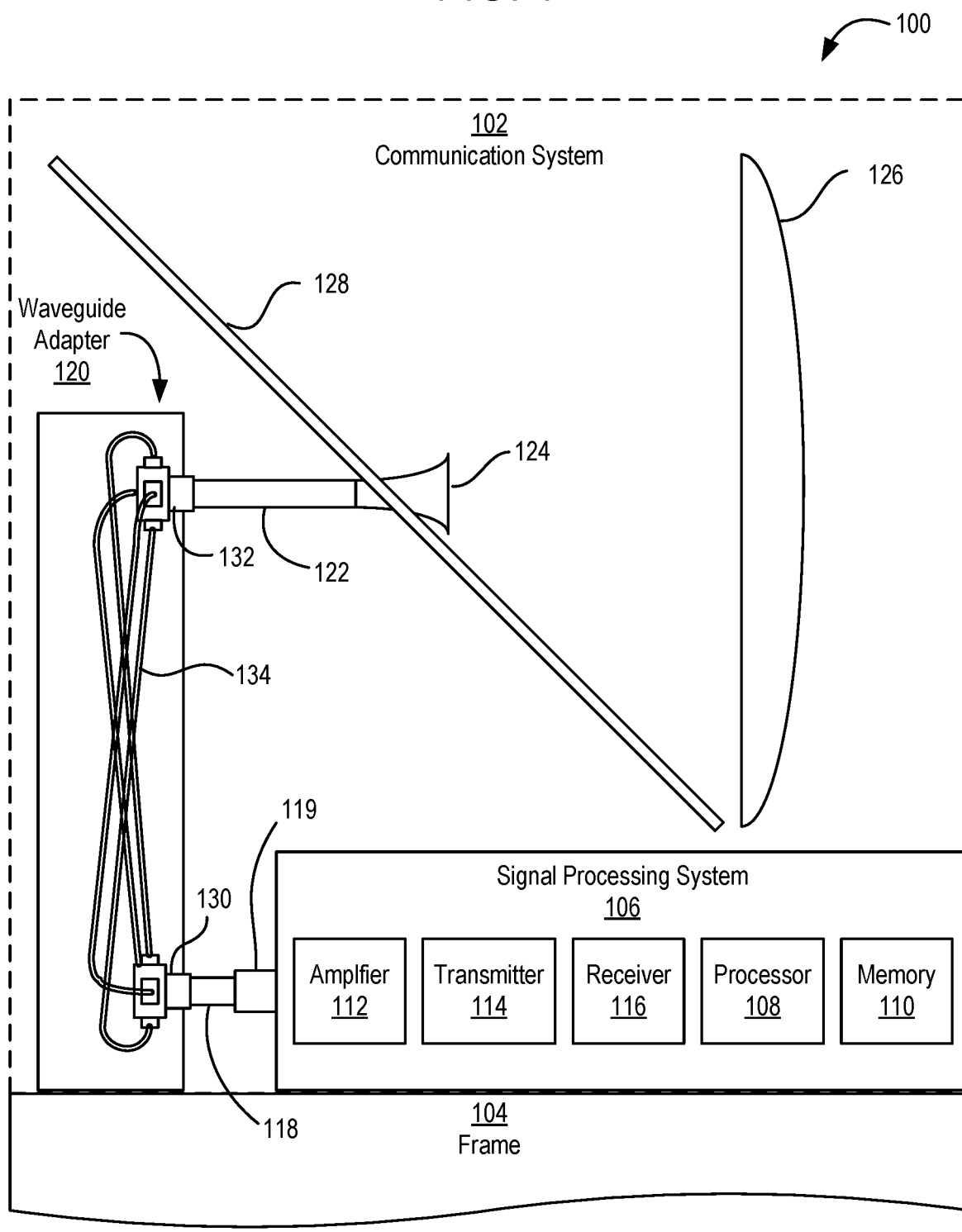
FIG. 1 illustrates an example of a satellite communication system that includes a multi-axis adapter for circular waveguides, connected with a satellite, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

One solution for transferring a signal between processing hardware and transmitting or collecting hardware is the use of a polarized waveguide, particularly for connecting the feed of a parabolic dish with signal processing hardware, such as but not limited to diplexers, receivers, power amplifiers, and transmitters. Circular polarization can be particularly useful due to the improved penetration by circularly polarized signals through buildings or other reception areas, as opposed to a signal with a single plane of polarization. The use of circular waveguides is straightforward in specific terrestrial applications where the signal processing hardware and the signal collecting or transmitting hardware can be well-aligned, but can be difficult to implement when a communication system is subject to space or geometry constraints. For example, traditional methods of routing circular waveguides can be impossible for high bandwidth applications that are space constrained, due to the generation of high order modes and phase shift in waveguides that are bent. These disadvantages impact the field of satellite communications in particular, where high bandwidth and penetration are desired, but physical space is at a premium. For example, for satellite payloads, including communication systems, space constraints often make it necessary to reroute the feeding network of the communications antenna. Attempting to bend circular waveguides is possible, but tends to generate high order modes, resulting in either very limited bandwidth or unacceptably high insertion loss across the waveguides.

Embodiments of the present disclosure are directed to, among other things, communications systems, which can include satellite communication systems, in which circularly polarized signals are utilized for transmissions and in which the path for passing circularly polarized signals within the communication system is bent or otherwise space constrained. According to various embodiments, circular waveguides are used for passing circularly polarized signals to and from signal processors (e.g., transmitters, receivers, amplifiers) as well as the hardware components of the communication system (e.g., a parabolic dish via a feed horn). The circularly polarized signals passing through the circular waveguides can be redirected by a wideband/multiband waveguide adapter. Various embodiments of waveguide adapters are described herein, but they commonly include respective first and second turnstile junctions connected by sets of linear waveguides. A circularly polarized signal can enter the waveguide adapter at one of the turnstile junctions, where it is transformed into a set of multiple linearly polarized signals and passed along the linear waveguides to the other of the turnstile junctions, where the set of multiple linearly polarized signals are used to generate a second circularly polarized signal that closely approximates the first. Unlike the circular waveguides, linear waveguides can be readily bent or twisted, even along a circuitous or serpentine path, without significant insertion loss or generation of high order modes. As a result, the linear waveguides can be converged at the second turnstile junction in a very different orientation relative to the first turnstile junction, resulting in the emission of the second circularly polarized signal along a different axis than the first circularly polarized signal.

The waveguide adapters described herein can generally operate across a wide band, including at least a range of frequencies from 17.7 GHz to 30 GHz. According to some embodiments, waveguide adapters described herein operate across dual frequency bands, including the first radio frequencies from 17.7 GHz to 20.2 GHz and a second range of frequencies from 27.5 GHz to 30 GHz. In addition, the waveguide adapters described herein can generally operate bidirectionally, in order to transmit signals generated by the signal processors (e.g. transmitters) passing the generated signals through the waveguide adapter and emitting the signal by a feed horn; and in order to receive signals by collecting received signals by the feed horn, passing the received signals through the waveguide adapter and processing the received signals by the signal processors (e.g. receivers). According to some embodiments, a diplexer can be placed along the circular waveguide between the signal processors and the waveguide adapter in order to preferentially filter signals in a transmission band to prevent interference with detecting received signals. The waveguide adapters described herein are generally adapted to redirect the circularly polarized signals between the signal processors and feed horn with minimal insertion losses of less than 0.4 dB, preferably less than 0.2 dB, within the frequency range of interest (for wideband applications) or within the frequency ranges of interest (for multiband applications). Waveguide adapters as described herein can achieve a return loss across the entire common port bend (i.e., from the connection of a first waveguide to the signal processor to the connection of a second waveguide to the antenna) of less than 20 dB. In addition to carrying circularly polarized signals, the waveguide adapters as described herein can also carry linearly polarized signals across a wide bandwidth. For example, the circular waveguides discussed herein can be replaced with any suitable waveguide that can carry two orthomodes. For example, both square and circular waveguides can be used, each of which can carry linearly polarized signals having two orthomodes.

A wide variety of specific configurations of the first and second turnstile junctions can be achieved using variations of the waveguide adapters described herein. For example, some adapters reverse the direction of transmission of the circularly polarized signal, can divert the circularly polarized signal orthogonally or at any arbitrary angle, or can route the circularly polarized signal, via the set of linearly polarized signals, from almost any arbitrary location in a communication system or satellite payload. One potential design application of the waveguide adapters described herein is the consolidation of signal processing electronics with other electronic components of a satellite payload, relocating signal processing electronics to protected areas of a satellite payload, or any other suitable reconfiguration to provide for more efficient use of space or to provide for simplified access.

Turning now to the figures, in which like enumeration indicates like elements, FIG. 1 illustrates an example of a satellite 100 including a satellite communication system 102 that includes a waveguide adapter 120 for circular waveguides, according to embodiments of the present disclosure. A partial section of the satellite 100 is shown, including a communication system 102, which is mounted to a frame 104. The frame 104 may include additional controls, processing units, and mechanical elements described in more detail with reference to FIG. 11. Communication systems described herein are described with reference to this satellite communication system 102, however it will be understood that the principles described herein apply to any suitable communications system that may employ a waveguide adapter, whether mounted to a satellite or terrestrial, with particular utility in space constrained applications. For example other communication systems that can benefit from utilizing the waveguide adapter described herein may include communication systems for vehicles, e.g. planes, ships, or land vehicles, or for enterprise or individual communication systems where compactness is desired such as, but not limited to, telecommunication systems, satellite-based television, communication, or internet applications.

The communication system 102 includes a signal processing system 106 that is connected with the frame 104 (or other suitable structure). The signal processing system 106 can include one or more processors 108 and a memory device 110 containing executable instructions that, when executed by the processor, configure the signal processing system to perform various tasks. For example, the signal processing system 106 can include a transmitter 114 that is configurable to generate a first circularly polarized signal for transmission by the signal processing component, a receiver 116 that is configurable to receive a circularly polarized signal, and an amplifier 112 that is configurable to adjust a power level of transmitted signals or received signals to enable signal transmission or signal reception. Although described in terms of satellite 100 and a satellite communication system 102, the communication system 102 can be mounted to any suitable frame for applications other than satellite communications, such as but not limited to: vehicle communications systems, e.g. automotive, aerospace, and marine communications systems; personal communication devices or receivers such as satellite data receivers, entertainment, or emergency communications gear; or enterprise communication systems such as broadcasting or receiving equipment including both ground stations and portable equipment.

A waveguide adapter 120 is connected with the satellite frame 104 and arranged to guide a first circularly polarized signal generated by the signal processing system by receiving the first circularly polarized signal along a first circular waveguide 118. The first circular waveguide 118 may be arranged along a first axis dictated by the overall design of the communications system 102 in view of the available space and geometry of the signal processing system 106 and other elements of the communications system 102, the surrounding structures, or other components that are not shown.

The waveguide adapter 120 includes a first turnstile junction 130 connected with the first circular waveguide 118 to convert the first circularly polarized signal from the first circular waveguide 118 into a set of multiple (e.g. four) linearly polarized signals that are offset in phase with respect to each other. In general, an orthomode transducer is a device for converting circularly polarized signals into linearly polarized signals by receiving a circularly polarized signal at a circular waveguide input, and outputting to linearly polarized signals via two rectangular waveguide outputs. According to some embodiments, the first turnstile junction 130 is a specialized orthomode transducer (OMT)

turnstile junction having four outputs, where each one of the linearly polarized signals generated by the turnstile junction is offset in phase by a quarter wavelength relative to the linearly polarized signals produced by adjacent outputs of the turnstile junction. According to some embodiments, the first circular waveguide 118 can connect directly between the signal processing system 106 and the first turnstile junction 130. Alternatively, the first circular waveguide 118 can connect with a diplexer 119 between the first turnstile junction 130 any signal processing system 106. A diplexer 119 can be configured to separate signals into different bands such that signals received in one band can be passed to the receiver 116 and so that signals generated by the transmitter 114 can be routed into the first circular waveguide 118 without interfering with received signals. According to some other embodiments, the turnstile junction can be substituted by a turnstile OMT using groove gap technology.

The outputs of the first turnstile junction 130 form four linear waveguides 134, each one of the linear waveguides positioned to receive a respective one of the linearly polarized signals. The linear waveguides 134 have the same effective length, so that the relative phase of each one of the linearly polarized signals exiting each linear waveguide remains the same with respect to the linearly polarized signals carried by the other linear waveguides exiting those waveguides. In other words, the linearly polarized signals carried by each one of the linear waveguides 134 experience the same phase shift over the length of the waveguides. The linear waveguides 134 connected with the first turnstile junction 130 diverge from the first turnstile junction at a first location, where the first turnstile junction is oriented to align the first turnstile junction with the signal processing system 106, due to the relative inflexibility of the first circular waveguide. The linear waveguides 134, however, can be bent and twisted without generating interference or higher-order modes within a frequency band of interest that includes, e.g., 17.7 GHz to 30 GHz, or in some cases across multiple bands including a first frequency band from about 17.7 GHz to 20.2 GHz and a second frequency band from about 27.5 GHz to about 30 GHz. According to some alternative embodiments, various ridge gap waveguides can be substituted for the rectangular or ridged waveguides described above. Suitable waveguides can include, but are not limited to: Substrate Integrated Waveguide (SIW), Air-Filled Substrate Integrated Waveguide (AFSIW), microstrip lines, and strip lines. The four linearly polarized signal outputs originating at the first turnstile junction 130 can have respective phase relationships of 0, 90, 180, and 270 degrees, the physical hardware (e.g. the linear waveguides 134) carrying the four outputs being orthogonal to each other and to the circular waveguide.

The linear waveguides 134 can be bent circuitously to avoid structural features or to be routed around other components, or can be bent to allow for an overall reorientation of the direction of the circularly polarized signal. For example, the four linear waveguides 134 can converge at a second turnstile junction 132 second location and second orientation that is different from the orientation of the first turnstile junction 130. As shown in FIG. 1, for example, the orientation of the first turnstile junction 130 and the second turnstile junction 132 can be reversed in order to flip the direction of the circularly polarized signal and take advantage of a compact space. However, the various component configurations enabled by the waveguide adapters described herein are not so limited, and can permit configurations to suit a wide variety of geometric requirements. At least one of the linear waveguides 134 can have additional bends arranged to lengthen the linear waveguide in order to match the effective length of the linear waveguide with the common effective length of the remainder of the linear waveguides, even where additional bends are not required for routing the linearly polarized signal. In some embodiments, the linear waveguides 134 can adopt circuitous or serpentine arrangements in order match their effective lengths without requiring unduly abrupt bends that might impact signal quality.

The second turnstile junction 132 is operably connected with the linear waveguides 134 for converting the linearly polarized signals into a second circularly polarized signal that approximates the first circularly polarized signal, and the second turnstile junction 132 outputs the second circularly polarized signal to a second circular waveguide 122. The second circular waveguide 122 is arranged along a different axis than that of the first circular waveguide 118. The second circular waveguide 122 can be adapted to a feed horn 124 of the communications system 102, which may directly transmit the second circularly polarized signal. Various types of antennas use a feed horn, including a horn antenna where the feed horn is the component the directly emits and receives electromagnetic signals. More commonly, a feed horn is used in conjunction with a parabolic dish by placing the feed horn at a focal point of a parabolic dish.

The feed horn 124 can be configured to support a particular type of polarization, e.g. circular polarization, and can therefore support improved signal quality by filtering some unwanted signals by allowing only electromagnetic signals having a specific polarity to enter the feed horn. For example, the polarization supported by the feed horn 124 can be controlled by the shape of the waveguide connected with the feed horn, a circular waveguide supporting both linear and circularly polarized signals, and a rectangular waveguide supporting linearly polarized signals. The geometry of the feed horn 124 can also be adapted to adjust the amount of gain provided by the feed horn. According to various embodiments, the feed horn 124 can direct the second circularly polarized signal against a dish antenna 126 for reflecting a directed signal toward a target. The transmit direction can be manipulated by an additional reflector 128 to achieve greater compactness of the overall communication system 102. In some cases, the antenna components (e.g. dish 126, reflector 128, or feed horn 124) can be exposed, or alternatively, the antenna components can be protected by a signal permeable enclosure 136.

According to some embodiments, the waveguide dimensions of the first circular waveguide 118 and the second circular waveguide 122 are not necessarily identical. In some cases, for improved gain, return loss, or axial ratio of the antenna, the size of the second circular waveguide where it connects with the feed horn 124 can vary from the optimum size of the common ports of the second turnstile junction. One solution is gradual tapering of the second circular waveguide, however, direct tapering can in some cases excite higher-order modes resulting in signal degradation. According to some embodiments, a transition of the waveguide size can be achieved at a connection between the linear waveguides 134 and the second turnstile junction 132, or the linear waveguides 134. The size (i.e., internal radius) of each of these circular waveguides is a function of the wavelength to be carried by the waveguide, and is limited by the cutoff frequency of the fundamental modes.

The first turnstile OMT junction 130 and the second turnstile OMT junction 132 are designed such that both of the two orthomodes of the respective common ports of the turnstile junctions are matched for all frequency bands of interest, which in some cases can include about 17.7 GHz to about 30 GHz in a wideband case, or in some other cases can include multiple bands, e.g., 17.7 to 20.2 GHz and 27.5 to 30 GHz for a specific multiband case. Step impedance matching can be applied to match the linear waveguides 134 with the first turnstile junction 130 and the second turnstile junction 132. Generally, the first turnstile junction 130 is connected via the first circular waveguide 118 with the signal processing system 106 and the second turnstile junction 132 is connected via the second circular waveguide 122 with antenna hardware, e.g. feed horn 124. However, electromagnetic signals can be passed bidirectionally through the waveguide adapter 120, therefore the configurations of the first turnstile junction 130 and the second turnstile junction 132 can be reversed.

Achieving a high bandwidth with minimal insertion loss can be achieved by sizing the waveguides (including the first circular waveguide 118 and second circular waveguide 122, as well as the linear waveguides 134) in order to place the operational frequency of the waveguide adapter between the destructive higher-order modes. In practice, this means placing the operational frequency of the waveguide adapter between a first frequency associated with the fundamental mode TE11 (or $f_{TE11}$) and a second frequency associated with the first high order destructive mode TE01 or TM11 (or $f_{TE01}/f_{TM11}$) so that $f_{TE11}$ is less than the operational frequency, which is less than $f_{TE01}$ or $f_{TE11}$). For operational frequencies in the range of 17.7 GHz to about 30 GHz, the first circular waveguide 118 and second circular waveguide 122 can have radii in the range of approximately 5.5 mm to about 6.7 mm. At radii in these ranges, the lower bound of available frequencies associated with TE11 is in the range from about 13 to about 16 GHz, and the upper bound of available frequencies associated with TE01 or TM11 is in the range from about 27 to 33 gigahertz. Other fundamental modes occur within the operational frequency, e.g. TM01 and TE21, however, the symmetry of the turnstile structure of the first turnstile junction 130 and the second turnstile junction 132 effectively cancel out these symmetric modes. The first higher-order modes that are not symmetric, and thus that cannot be canceled by symmetric turnstiles, or TE01 and TM11. According to some embodiments, at least one of the first turnstile junction 130 and second turnstile junction 132 can have a radius in the range of about 5.3 mm to 6.7 mm, preferably between 5.3 mm and 6 mm, and more preferably about 5.35 mm, resulting in an operational window between the adjacent destructive modes TE01 and TM11 and the fundamental mode TE11 of about 15.8 GHz to about 32.8 GHz.

The embodiments described above focus on bending circularly polarized signals, but the same structures can be used for bending circular or square waveguides carrying linearly polarized signals having orthogonal modes. As long as the circular waveguide or square waveguide carries dual orthogonal modes for a wide bandwidth, regardless of whether the signal uses linear, circular, or elliptical polarization, the OMT turnstile junction will help to suppress the symmetrical higher order modes. The adapters described herein can also carry linearly polarized signals across a high bandwidth, as the orthomodes of linearly polarized signals can be converted into circularly polarized signals via a wideband polarizer. Suitable wideband polarizers can include, e.g., a half wave plate, quarter-wave plate (HWPQWP) polarizer, which converts two orthogonal modes (e.g., horizontal and vertical modes) of a signal into circularly polarized signals, e.g., right-handed circularly polarized (RHCP) and left-handed circularly polarized (LHCP) signals. According to various alternative embodiments, the first circular waveguide 118 and second circular waveguide 122 can be replaced one-for-one with suitable square waveguides, which can carry orthogonal linearly polarized signals instead of circularly polarized signals. The turnstile junctions 130, 132 can be replaced in the alternative embodiments with suitable OMT turnstile junctions compatible with the square waveguides.

Figure 2:
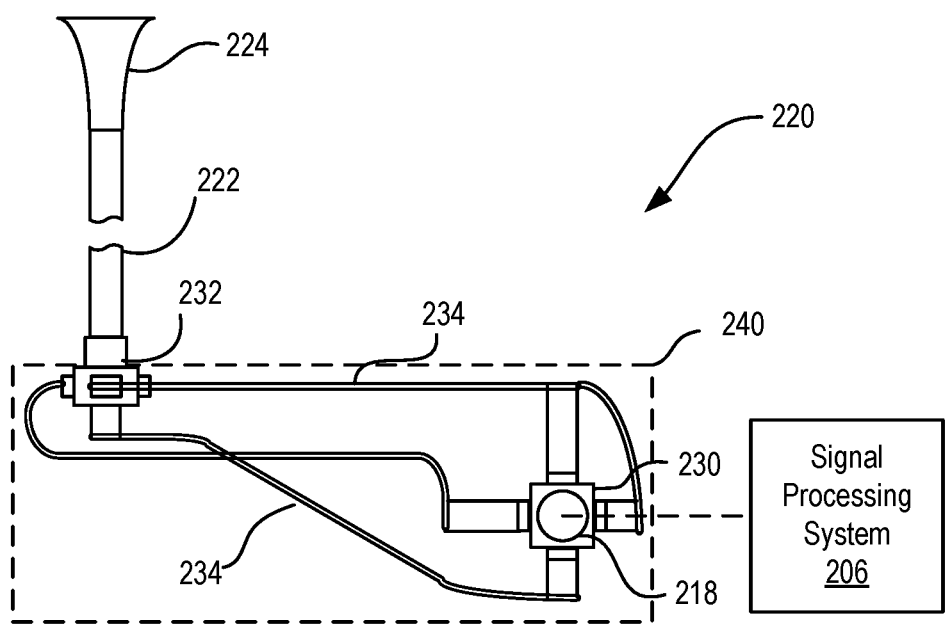
FIG. 2 illustrates an example of a waveguide adapter having rigid linear waveguides and orthogonally arranged circular waveguides, according to embodiments of the present disclosure.

FIG. 2 illustrates an example of a waveguide adapter 220 having rigid linear waveguides 234 and orthogonally arranged first circular waveguide 218 and second circular waveguide 222, according to embodiments of the present disclosure. The waveguide adapter 220 illustrates how rigid linear waveguides 234 can be used to provide for practically arbitrarily positioning of a signal processing element 206 and feed horn 224 by permitting the free positioning of a first circular waveguide 218 with respect to a second circular waveguide 222. It will be understood that many other orientations of the first circular waveguide 218 and second circular waveguide 222 are possible by varying the topography of the intervening elements, in accordance with various embodiments. Additionally, rigid linear waveguides having a variety of bend profiles for supporting linearly polarized signals are commercially available, or can be adapted from known bend profiles with suitable internal dimensions to accommodate the linearly polarized signals in the target frequency range. In general, rigid linear waveguides can be combined in series to achieve complex bend profiles without significantly impacting insertion loss or signal quality as long as the frequency range of the linearly polarized signals is within a design frequency range of the linear waveguides.

The waveguide adapter 220 includes a first turnstile junction 230 that is operably connected to receive a circularly polarized signal from a first circular waveguide 218. The circularly polarized signal can originate from a signal processing element 206, similar to the signal processing element 106 described above with reference to FIG. 1. The first turnstile junction 230 inputs the circularly polarized signal and outputs for linearly polarized signals that are offset in phase with respect to each other along four linear waveguides 234. According to various embodiments, the first turnstile junction 230 can be a turnstile orthomode transducer (OMT) junction that takes in a circularly polarized signal and separates the linear orthogonal components from the circularly polarized signal, outputting the separated linear orthogonal components at separate outputs, each linear orthogonal component being a linearly polarized signal that can be passed through a linear waveguide, such as a rectangular, single ridged, or double reached waveguide. According to some embodiments, the first turnstile junction 230 can separate a circularly polarized signal into four outputs, providing for orthogonal linearly polarized signals that are offset in phase by a quarter wavelength. According to some other embodiments, the first turnstile junction 230 can separate a circularly polarized signal into two outputs, one output providing the horizontally polarized part of the circularly polarized signal, and the other output providing the vertically polarized part of the circularly polarized signal. In either case, the separated orthogonal linearly polarized signals are passed into respective linear waveguides 234.

According to some alternative embodiments, turnstile junctions having alternative arrangements that generate more than two linearly polarized outputs, for more than four linearly polarized signal outputs, may be used. For embodiments producing more than four linearly polarized signal outputs, a concomitant number of linear waveguides can be used to receive and transfer the linearly polarized signal outputs from the first turnstile junction 230 in order to converge the linearly polarized signals the second turnstile junction 230 to generate the second circularly polarized signal.

The linear waveguides 234 can be routed through intervening space between the first turnstile junction 230 and a second turnstile junction 232 according to any suitable topography as required to avoid other components (e.g. of the communication system in which the waveguide adapter 220 is installed, or other mechanical or electrical components of, for example, a satellite). The linear waveguides 234, however, should have a common effective length so that the phase offset of the linearly polarized signals passing through the linear waveguides match where the linear waveguides diverge from the first turnstile junction 230 and where they converge at the second turnstile junction 232. Therefore, some linear waveguides 234 may be relatively straight for bridging a gap between opposite sides of the first turnstile junction 230 and second turnstile junction 232, whereas some other linear waveguides 234 that connects adjacent sides of the turnstile junctions may alternative paths to increase their effective lengths in order to match. At least one of the linear waveguides 234 can have additional bends arranged to lengthen the linear waveguide in order to match the effective length of the linear waveguide with the common effective length of the remainder of the linear waveguides, even where additional bends are not required for routing the linearly polarized signal. In some embodiments, the linear waveguides 234 can adopt circuitous or serpentine arrangements in order match their effective lengths without requiring unduly abrupt bends that might impact signal quality.

According to various embodiments, the linear waveguides 234 can be rigid, and thus formed according to a predefined set of bends that minimizes insertion loss along the linear waveguides and also provides for durability of the overall waveguide adapter 220. However, in some cases it can be advantageous to allow for some movement or reorientation as between the first circular waveguide 218 and the second circular waveguide 222. Portions of the linear waveguides 234, up to and including all of the linear waveguides, can also be flexible. According to some embodiments, the linear waveguides 234 can be routed individually around components, taking advantage of the free volume surrounding the linear waveguides to efficiently pack components of, for example, a communications system or a satellite. According to some other embodiments, the linear waveguides 234, the first turnstile junction 230, and a second turnstile junction 232 can be contained and protected by an enclosure 240.

Figure 3:
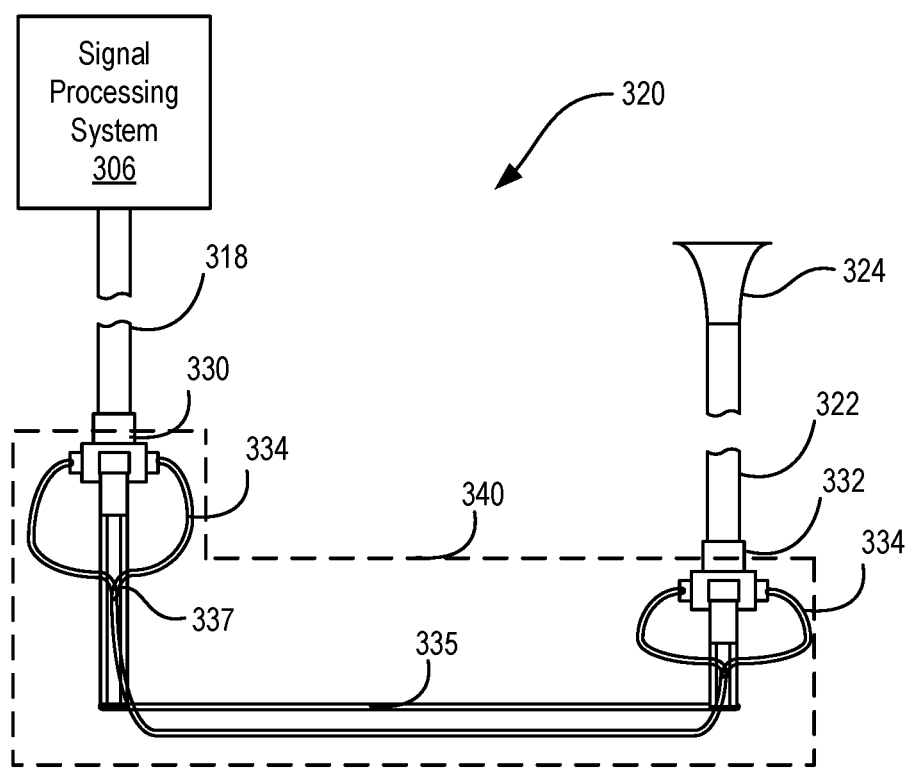
FIG. 3 illustrates an example of a waveguide adapter having to rigid linear waveguides and offset circular waveguides opening in the same direction, according to embodiments of the present disclosure.

Waveguide adapters as described herein can provide for many different configurations of input and output ports for the circularly polarized signals, and can also use a different number of linear waveguides. For example, FIG. 3 illustrates a waveguide adapter 320 having two rigid linear waveguides 334 with a reversal and offset between the first circular waveguide 318 and second circular waveguide 322, according to embodiments of the present disclosure. It will be understood that many other orientations of the first circular waveguide 318 and second circular waveguide 322 are possible by varying the topography of the intervening elements, in accordance with various embodiments.

The waveguide adapter 320 includes a first turnstile junction 330 that is operably connected to receive a circularly polarized signal from a first circular waveguide 318. The circularly polarized signal can originate from a signal processing element 306, similar to the signal processing element 106 described above with reference to FIG. 1. The first turnstile junction 330 inputs the circularly polarized signal and outputs linearly polarized signals that are offset in phase with respect to each other along four linear waveguides 334. According to various embodiments, the first turnstile junction 330 can be a turnstile orthomode transducer (OMT) junction that takes in a circularly polarized signal and separates the linear orthogonal components from the circularly polarized signal, outputting the separated linear orthogonal components at separate outputs, each linear orthogonal component being a linearly polarized signal that can be passed through a linear waveguide, such as a rectangular, single ridged, or double reached waveguide. According to some embodiments, the first turnstile junction 330 can separate a circularly polarized signal into four outputs along respective linear waveguides 334, providing for orthogonal linearly polarized signals that are offset in phase by a quarter wavelength. Opposing waveguides 334 carrying opposite linearly polarized signals can be joined as a pair of combined linear waveguides 335 using a symmetric power combiner/dividers 337, resulting in one of the combined linear waveguides 335 carrying the horizontally polarized part of the circularly polarized signal, and the other one of the combined linear waveguides 335 carrying the vertically polarized part of the circularly polarized signal.

The combined linear waveguides 335 containing the linear waveguides 334 can be routed through intervening space between the first turnstile junction 330 and a second turnstile junction 332 according to any suitable topography as required to avoid other components (e.g. of the communication system in which the waveguide adapter 320 is installed, or other mechanical or electrical components of, for example, a satellite). As in waveguide adapter 220 (FIG. 2), linear waveguides 334 should still have a common effective length so that the phase offset of the linearly polarized signals passing through the linear waveguides match where the linear waveguides diverge from the first turnstile junction 330 and where they converge at the second turnstile junction 332.

According to various embodiments, the linear waveguides 334 can be rigid, and thus formed according to a predefined set of bends that minimizes insertion loss along the linear waveguides and also provides for durability of the waveguide adapter 320. The rigid linear waveguides can support a wide variety of bend profiles, and many suitable waveguide geometries are commercially available and can be strung together to achieve complex waveguide paths, or can be adapted from known bend profiles with suitable internal dimensions to accommodate the linearly polarized signals in the target frequency range. In general, rigid linear waveguides can be combined in series to achieve complex bend profiles without significantly impacting insertion loss or signal quality as long as the frequency range of the linearly polarized signals is within a design frequency range of the linear waveguides. In some alternative embodiments, portions of the linear waveguides 334, up to and including all of the linear waveguides, as well as the combined linear waveguides 335 can also be flexible. The combined linear waveguides 335 can be routed individually around components, taking advantage of the free volume surrounding the linear waveguides to efficiently pack components of, for example, a communications system or a satellite. According to some other embodiments, the linear waveguides 334, the first turnstile junction 330, and a second turnstile junction 332 can be contained and protected by an enclosure 340.

As shown in FIG. 2 and FIG. 3, linear waveguides can be routed individually, or can be paired and routed together in order to simplify routing, and can be rigid or flexible, according to various embodiments of the disclosure. In some embodiments utilizing flexible linear waveguides, the flexibility can be used to permit changing the orientation of one or more communication system components, as shown in FIG. 4.

Figure 4:
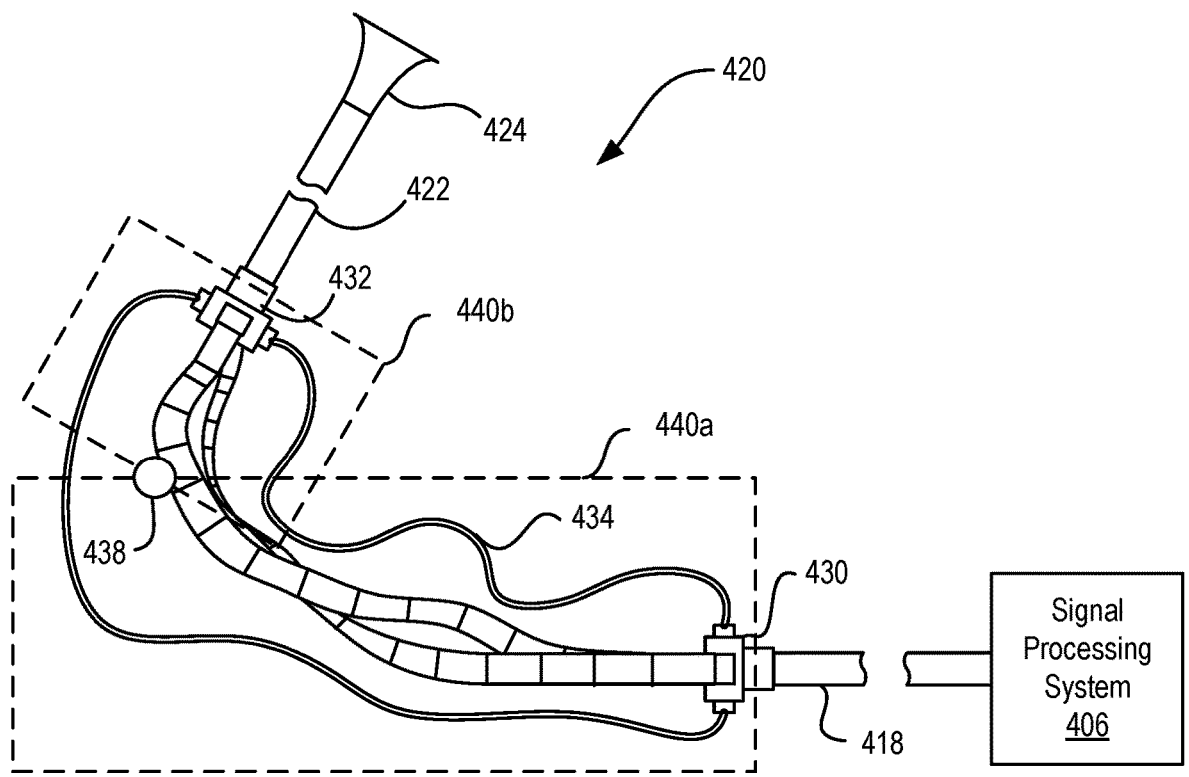
FIG. 4 illustrates an example of a waveguide adapter having flexible linear waveguides that can facilitate gimbaling by allowing for a relative orientation of the circular waveguides to change, according to embodiments of the present disclosure.

FIG. 4 illustrates an example of a waveguide adapter 420 having flexible linear waveguides 434 that can facilitate gimbaling by allowing for a relative orientation of the second circular waveguide 322 to change relative to an orientation of the first circular waveguide 318, according to embodiments of the present disclosure. The waveguide adapter 420 includes a first turnstile junction 430 that is operably connected to receive a circularly polarized signal from a first circular waveguide 418. According to various embodiments, the first turnstile junction 330 can be a turnstile orthomode transducer (OMT) junction that takes in a circularly polarized signal and separates the linear orthogonal components from the circularly polarized signal, outputting the separated linear orthogonal components at separate outputs, each linear orthogonal component being a linearly polarized signal that can be passed through a linear waveguide, such as a rectangular, single ridged, or double reached waveguide.

The signal processing system 106 described above with reference to FIG. 1. The first turnstile junction 430 inputs the circularly polarized signal and outputs for linearly polarized signals that are offset in phase with respect to each other along four linear waveguides 434. As described above, the first turnstile junction 430 can separate a first circularly polarized signal into four outputs, providing for orthogonal linearly polarized signals that are offset in phase by a quarter wavelength. According to some other embodiments, the first turnstile junction 430 can separate a circularly polarized signal into two outputs, one output providing the horizontally polarized part of the circularly polarized signal, and the other output providing the vertically polarized part of the circularly polarized signal. In either case, the separated orthogonal linearly polarized signals are passed into respective linear waveguides 434.

The linear waveguides 434 are flexible waveguides that can be rectangular, single ridged, or double ridged waveguides, or may have other suitable internal waveguide geometries sized for the frequency range of interest. The flexible, linear waveguides 434, similar to other linear waveguides disclosed herein, diverge from the first turnstile junction 430 and converge at a second turnstile junction 432, where linearly polarized signals pass along the linear waveguides are converted into a second circularly polarized signal that approximates the first circularly polarized signal. The flexible, linear waveguides 434 include additional serpentine bends so that each one of the linear waveguides matches a common effective length of all of the linear waveguides. In addition, the flexible, linear waveguides 434 may include some additional serpentine bends that act as slack to allow for deformation of the waveguide adapter 420 as a whole, in order to permit the second turnstile junction 432 to rotate and/or displace relative to the first turnstile junction 430.

According to some embodiments, displacement of the second turnstile junction 432 relative to the first turnstile junction 430 can be used to redirect a second circular waveguide 422 and feed horn 424. In some cases, such displacement may be used for aiming antenna to transmit or receive signals. This application may be rare in the context of satellite communication systems due to the maintenance difficulties inherent in satellite technology, but can be common in terrestrial communication systems where the ability to physically rotate an antenna is beneficial. In the satellite context, flexible linear waveguides 434 can be used to facilitate rare or one-time displacement of communication system components, e.g., second circular waveguide 422 and feed horn 424, for the purpose of facilitating denser packing for launch, and to permit simplified or even automated unfolding for deployment. According to some embodiments, the linear waveguides 434 can include portions that are flexible as well as portions that are rigid, with flexible portions positioned where necessary to allow for specific displacements. According to some embodiments, an enclosure 440 connected with the waveguide adapter 420 can be configured to facilitate displacements by, for example, including one or more pivoting connections 438 that allow relative movement of subsections 440a, 440b of the enclosure.

Figure 5:
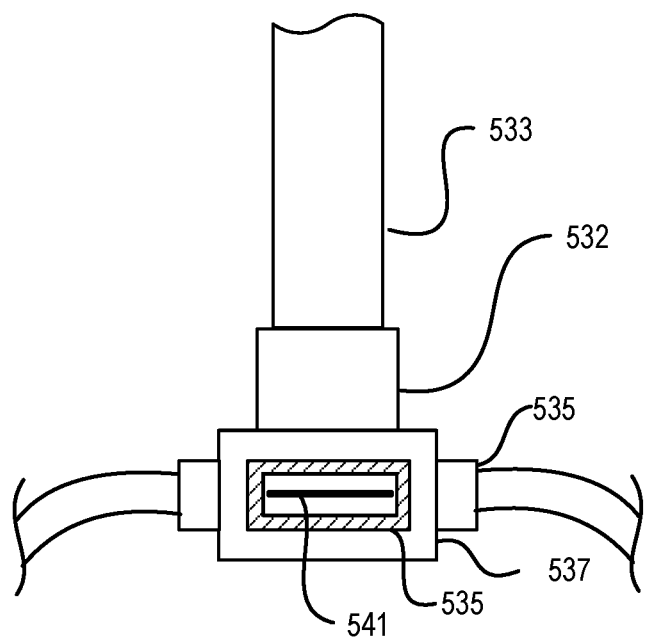
FIGS. 5-7 illustrate nonlimiting examples of suitable linear waveguides including a rectangular waveguide (FIG. 5), ridged waveguides (FIG. 6), and a groove gap waveguide (FIG. 7), according to embodiments of the present disclosure.
Figure 6:
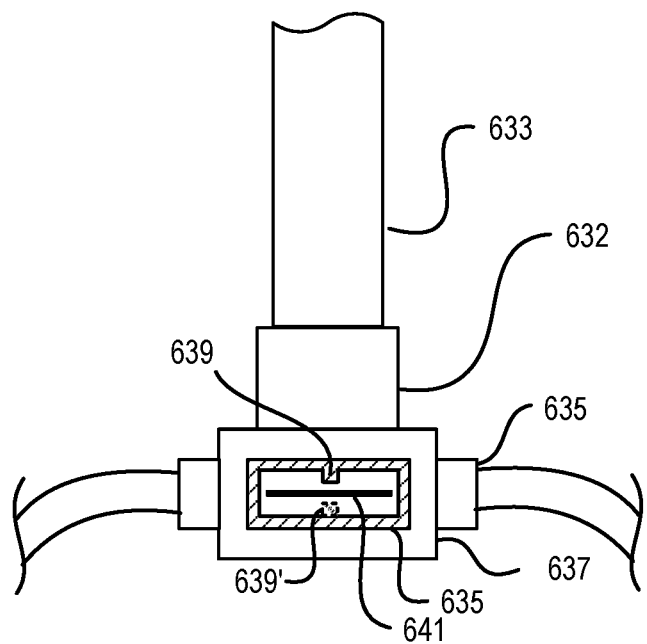
Figure 7:
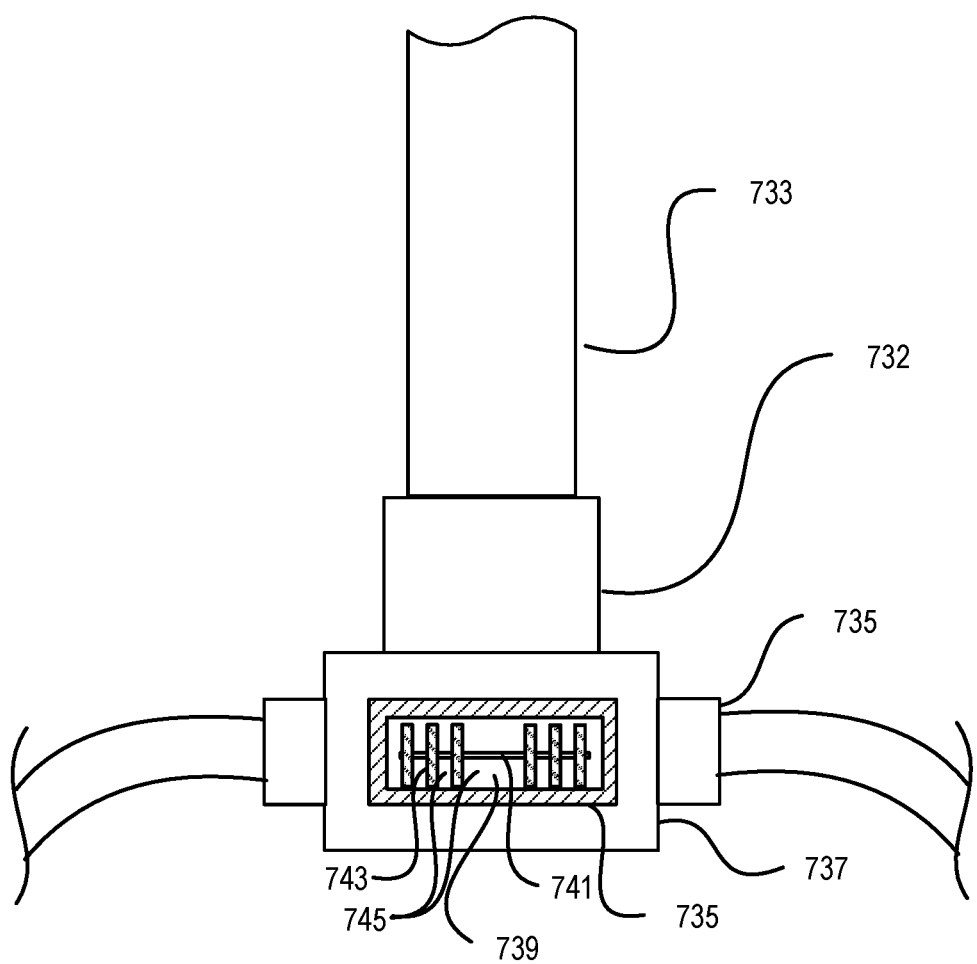

FIGS. 5-7 illustrate nonlimiting examples of suitable linear waveguides including a rectangular waveguide 534 (FIG. 5), a single ridged waveguide 634 (FIG. 6), and a double ridged waveguide 734 (FIG. 7), according to embodiments of the present disclosure. All of the circular waveguides, turnstile junctions, and linear waveguides are configured (i.e., internally dimensioned) to pass electromagnetic signals having frequencies that at least include the range of 17.7 GHz to about 30 GHz, though it will be understood that the waveguides can be resized to accommodate electromagnetic frequencies in other bands for alternative communication regimes, e.g, radio, microwave, visible light, and others. According to some embodiments, the waveguides can be used in single mode operation for a wideband (e.g. from about 18 GHz to about 40 GHz), and as a result the waveguides can be bent and twisted without generating higher-order modes within the designated bandwidth. Depending on the loss constraints (i.e. the amount of insertion loss that can be tolerated for a particular application), flexible linear waveguides can be substituted for any of the rectangular waveguide, single ridged waveguide, double ridged waveguide, groove gap waveguide, or alternative embodiments using other varieties of linear waveguides.

FIG. 5 shows a first example of a turnstile orthomode transducer (OMT) junction 532 having a common port 533 that can act as an inlet or outlet for passing a circularly polarized signal. A set of four linear ports 535 diverge from the common port 533 at a junction body 537, where the common port 533, four linear ports, and junction body define a vacuum space in which the electromagnetic waves forming the circularly polarized signal are directed via internal reflection. An interior of the turnstile junction 532 contains a series of quarter-wave plates 541 arrayed in alignment with the four linear ports 535 that convert the circularly polarized signal to single linear polarization. The interior of the junction body 537 may include additional features arranged to direct the signal such as stepped reflecting surfaces, tuning elements such as plates and stubs for adjusting impedance, or other features (not shown). Conversely, passing linearly polarized signals through the quarter-wave plates can reassemble single linearly polarized signals received at the turnstile junction into a circularly polarized signal. The turnstile junction 532 can be aluminum, which is electromagnetically reflective within the frequency band of interest, but in alternative embodiments the turnstile junctions can be formed of any other suitable material that is rigid, sufficiently durable, and EM reflective in a desired frequency range. When the circularly polarized signal is received in the common port 533 and passes to the junction body 537, linearly polarized signals are generated at each of the four linear ports 535, which propagate outward from the junction body. Rectangular waveguides can be advantageous for applications requiring high power handling and a high cutoff frequency.

FIG. 6 shows a second example of a turnstile orthomode transducer (OMT) junction 632 having a common port 633 that can act as an inlet or outlet for passing a circularly polarized signal. A set of four linear ports 635 diverge from the common port 633 at a junction body 637, where the common port 633, four linear ports, and junction body define a vacuum space in which the electromagnetic waves forming the circularly polarized signal are directed via internal reflection. When the circularly polarized signal is received in the common port 633 and passes to the junction body 637, linearly polarized signals are generated via quarter-wave plates 641 at each of the four linear ports 635, which propagate outward from the junction body. The interior of the junction body 637 may include additional features arranged to direct the signal such as stepped reflecting surfaces, tuning elements such as plates and stubs for adjusting impedance, or other features (not shown). The linear ports 635 can be connected with ridged waveguides, i.e., waveguides containing internal protrustions that alter the characteristic impedance and power handing capability of the waveguide. Single ridged waveguides, for example, resemble rectangular waveguides with an additional protruding ridge 639, and tend to exhibit lower impedance and a wider bandwidth when operating in their fundamental mode as compared to rectangular waveguides. Single ridged waveguides can be advantageous for applications requiring impedance matching, because the ridged waveguides decrease the characteristic impedance, and can provide for greater bandwidth. Double ridged waveguides resemble rectangular waveguides with two additional protruding bridges 639, and resemble single ridged waveguides in function, offering further decreased characteristic impedance and higher bandwidth, at the cost of lower power handling capability. Therefore, double ridged waveguides can be advantageous for applications requiring greater bandwidth that are not power limited.

FIG. 7 shows a third turnstile orthomode transducer (OMT) junction 732 having a common port 733 that can act as an inlet or outlet for passing a circularly polarized signal. A set of four linear ports 735 diverge from the common port 733 at a junction body 737, where the common port 733, four linear ports, and junction body define a vacuum space in which the electromagnetic waves forming the circularly polarized signal are directed via internal reflection. When the circularly polarized signal is received in the common port 733 and passes to the junction body 737, linearly polarized signals are generated via quarter-wave plates 741 at each of the four linear ports 735, which propagate outward from the junction body. As an alternative to either a ridged waveguide or rectangular waveguide, the OMT junction 732 can connect with a groove gap waveguide, characterized by a series of closely spaced internal features 743 that alternate with gaps 745, the sizing and spacing tuned to prevent the generation of interference or high-order modes when the waveguide passes frequencies in the range of interest.

In the communication systems described above, waveguide adapters (e.g. waveguide adapter 120, FIG. 1) employ linear waveguides that diverge from a first turnstile junction in a set configuration, and converged on a second turnstile junction in the same configuration, i.e. with the linear waveguides connecting in the same order around each turnstile junction. However, in some embodiments, the linear waveguides can be connected in a reversed configuration, as shown in FIG. 8.

Figure 8:
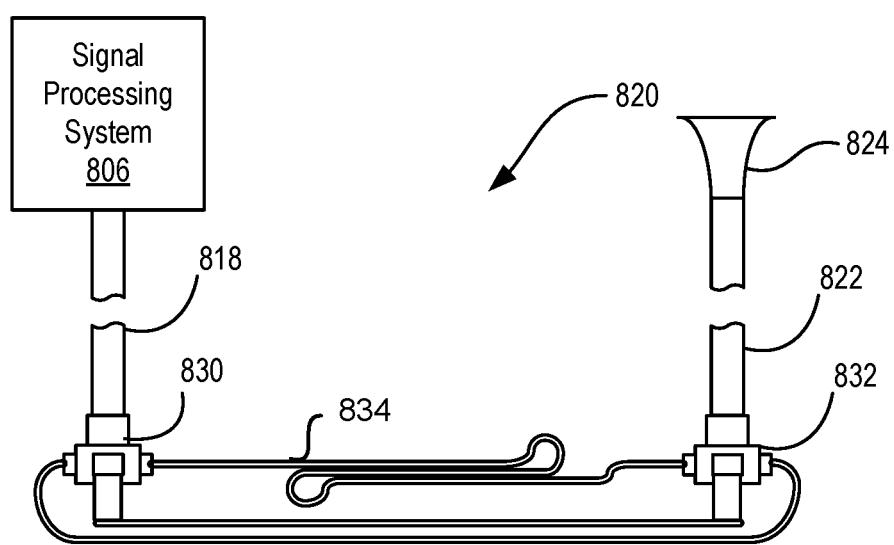
FIG. 8 illustrates an example of a waveguide adapter in which a connection order of the linear waveguides is reversed, according to embodiments of the present disclosure.

FIG. 8 illustrates an example of a waveguide adapter 820 in which a connection order of the linear waveguides 834 is reversed, according to embodiments of the present disclosure, resulting in a reversed handedness of the second circularly polarized signal that will emanate from the second circular waveguide 822 relative to the handedness of the first circularly polarized signal entering the first circular waveguide 818.

The waveguide adapter 820 includes a first turnstile junction 830 that is operably connected to receive a circularly polarized signal from a first circular waveguide 818. The circularly polarized signal can originate from a signal processing system 806, similar to the signal processing system 106 described above with reference to FIG. 1. The first turnstile junction 830 inputs the circularly polarized signal and outputs for linearly polarized signals that are offset in phase with respect to each other along four linear waveguides 834. According to various embodiments, the first turnstile junction 830 can be a turnstile orthomode transducer (OMT) junction that takes in a circularly polarized signal and separates the linear orthogonal components from the circularly polarized signal, outputting the separated linear orthogonal components at separate outputs, each linear orthogonal component being a linearly polarized signal that can be passed through a linear waveguide, such as a rectangular, single ridged, or double reached waveguide. According to some embodiments, the turnstile junction 830 can separate a circularly polarized signal into four outputs having a phase relationship of 0, 90, 180, and 270 degrees, the physical hardware (e.g. rectangular waveguides) carrying the four outputs being orthogonal to each other and to the circular waveguide.

The linear waveguides 834 can be routed through intervening space between the first turnstile junction 830 and a second turnstile junction 832 according to any suitable topography as required to avoid other components (e.g. of the communication system in which the waveguide adapter 820 is installed, or other mechanical or electrical components of, for example, a satellite). The linear waveguides 834, however, have a common effective length so that the phase offset of the linearly polarized signals passing through the linear waveguides match where the linear waveguides diverge from the first turnstile junction 830 and where they converge at the second turnstile junction 832. Therefore, some linear waveguides 834 may be relatively straight for bridging a gap between opposite sides of the first turnstile junction 830 and second turnstile junction 832, whereas some other linear waveguides 834 that connects adjacent sides of the turnstile junctions may include additional serpentine bends to lengthen their effective lengths in order to match. At least one of the linear waveguides 834 can have additional bends arranged to lengthen the linear waveguide in order to match the effective length of the linear waveguide with the common effective length of the remainder of the linear waveguides, even where additional bends are not required for routing the linearly polarized signal.

In contrast with previously discussed waveguide adapters (e.g. waveguide adapter 220, FIG. 2), the linear waveguides 834 of waveguide adapter 820 are connected with the first turnstile junction 830 and the second turnstile junction 832 in symmetrical but reversed configurations. For example, if the linear waveguides 834 connect to the first turnstile junction 830 in an ABCD configuration, they can connect to the second turnstile junction 832 in a CBAD configuration. However, the reversal in connection order does not result in a change in signal quality or insertion loss, but does result in a reversal of the handedness of the second circularly polarized signal that will be emitted from the second turnstile junction with reference to the first circularly polarized signal passed into the first turnstile junction. As evident in the construction of waveguide adapter 820, allowing for this reversal opens up alternative geometries for arranging the turnstile junctions 830, 832 and for routing the linear waveguides 834. The handedness of a circularly polarized signal can be corrected via hardware or software, and is therefore not an impediment to signal processing.

According to various embodiments, the linear waveguides 834 can be rigid, and thus formed according to a predefined set of bends that minimizes insertion loss along the linear waveguides and also provides for durability of the waveguide adapter 820. Additionally, rigid linear waveguides having a variety of bend profiles for supporting linearly polarized signals are commercially available, or can be adapted from known bend profiles with suitable internal dimensions to accommodate the linearly polarized signals in the target frequency range. In general, rigid linear waveguides can be combined in series to achieve complex bend profiles without significantly impacting insertion loss or signal quality as long as the frequency range of the linearly polarized signals is within a design frequency range of the linear waveguides. According to other embodiments, the linear waveguides 834 can be flexible, can include mixed segments that are flexible and rigid, or can include a subset of linear waveguides that are flexible and a subset that are rigid.

Various methods for implementing the approaches to transmitting and receiving data via a dual-band/or multiband phased antenna array as described above are described in detail below with reference to FIGS. 9 and 10. Some or all of process 900 and 1000 described below (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In various embodiments, the processes 900 and 1000, or combinations thereof may be carried out by, e.g., a local controller such as the signal processing system 106 (FIG. 1) or any other suitable controller or signal processing system described herein, or by a network accessible remote controller that communicates with a local satellite controller via a network, or by a combination of the above.

FIG. 9 illustrates an example of a first process 900 for transmitting and receiving data by a satellite communication system employing signals transmitted between signal processing hardware and an antenna by way of a waveguide adapter, according to embodiments of the present disclosure. These process steps can apply to circularly polarized signals transmitted along circular waveguides, or to linearly polarized signals across a wide frequency band transmitted along square or circular waveguides. First, the system can cause a transmitter to generate a first signal based on stored instructions or stored data, amplify the signal, and pass the signal along a first waveguide (e.g., a square or circular waveguide). (Act 901).

The first waveguide can be connected with a port of a first turnstile junction. The first turnstile junction can generate, from the first signal, a set of linearly polarized signals that are out of phase with respect to each other. (Act 903). Typically, four linearly polarized signals will be generated by the turnstile junction and output along linear waveguides arranged orthogonally with respect to each other and orthogonally with respect to the first waveguide. In this case, each linearly polarized signal will be offset in phase with respect to the linearly polarized signals along neighboring linear waveguides by a quarter wave.

After the linearly polarized signals are generated, each one of the linearly polarized signals can be passed along one of the respective linear waveguide from a first location to a second location, where the linear waveguides converge to connect with a second turnstile junction in a similar configuration to their connection with the first turnstile junction (i.e. in the same order, or in some cases in a reversed order). (Act 905). Unlike the first waveguide, the linear waveguides can be bent at relatively sharp angles including u-shaped bends and twists that allow for the linear waveguides to adopt almost arbitrary configurations without the bends causing significant degradation of signal quality or generating interference in any major higher-order modes for signals within the frequency band or bands of interest. The linear waveguides have the same common effective length (i.e., the distance "seen" by a signal passing along each of the waveguides). Therefore the linearly polarized signals retain the same offsets in phase with respect to each other at each and of each one of the linear waveguides.

The linearly polarized signals are merged at the second turnstile junction in order to generate a second signal that approximates the first signal. (Act 907). Signal loss (or insertion loss) caused by the transition from the first signal, to the linearly polarized signals, and to the second signal can be minimized by utilizing linear waveguides having appropriate internal dimensions and appropriate curvatures for the frequency band of interest. The efficiency of the adapter can be described in terms of return loss (i.e., the loss of power in the signal across the communication system with the adapter) or insertion loss (i.e., the loss of signal power resulting from the addition of the adapter.) Waveguide adapters as described herein can achieve a return loss across the entire common port bend for a frequency range from 17.7 to 30 GHz of less than 20 dB. In addition to carrying circularly polarized signals, the waveguide adapters as described herein can also carry linearly polarized signals across a wide bandwidth. Insertion losses are preferably minimized to increase the efficiency of the communication system. According to some embodiments, insertion loss can be less than 0.2 dB across multiple bands, e.g. between 17.7 and 20.2 GHz and between 27.5 and 30 GHz. According to some other embodiments signal loss across the chain of signal conversion can be small across a wide band, e.g., averaging an insertion loss of less than 0.2 dB between 17.7 and 30 GHz. According to yet other embodiments, signal loss across the chain of signal conversion can be small across a wide band e.g. having an insertion loss of less than 0.4 dB between 17.7 and 30 GHz, and preferentially reduced to less than 0.2 dB in specific bands, e.g. between 17.7 and 20.2 GHz and between 27.5 and 30 GHz.

Due to the bends in the linear waveguides, the physical orientation of the second turnstile junction can be significantly different from the orientation of the first turnstile junction, thus the second signal can be passed along a second waveguide having a different orientation from the first waveguide, e.g. orthogonal, orthogonal and offset, doubled back, or otherwise positioned along an arbitrary second axis different from a first axis defining the first waveguide. (Act 909).

The second signal can be passed directly from the second waveguide for transmission by antenna by, e.g., directing the second signal from the second waveguide into a feed horn for a transmitter, such as but not limited to a dish transmitter, which can which can have many possible physical configurations and orientations. (Act 911). As shown in FIG. 1, the feed horn can admit through a reflector opposite a dish which can then redirect the signal around the feed horn, or the feed horn can emit toward a parabolic dish that redirects the signal directly toward the target without reflection. Signal aiming can be achieved by, for example, rotating the entire assembly or by rotating the dish and/or reflector.

A third signal may be received at the feed horn after being reflected and collected by the antenna, resulting in an additional signal being passed in reverse along the second waveguide. (Act 913). In the same way that the first signal was divided into a set of linearly polarized signals at the first turnstile junction, the second turnstile junction can convert the third signal into another set of linearly polarized signals that can pass in the reverse direction along the linear waveguides. (Act 915). These additional linearly polarized signals can be converted into a fourth signal and passed along the first waveguide to be received by a receiver, where the signals may be amplified and/or decoded. (Act 917).

According to some embodiments, the transmission band (i.e. the first signal) can be in a different range of frequencies than a reception band (i.e. the third signal). Similar multi-band embodiments can utilize multiple transmission bands or multiple reception bands, and where the transmission and reception frequencies are sufficiently different, the system can simultaneously transmit and receive. According to some embodiments, the system can use time division duplexing (TDD), frequency division duplexing (FDD), a combination of both, or any other suitable means for avoiding interference between the transmitted and received signals for embodiments in which bidirectional use of the communication system is desired.

Similar functionality can be achieved with differences in the structure of the waveguide adapter. For example, suitable bent constructions can be realized using as few as two linear waveguides, and in some embodiments, flexible linear waveguides can be used to permit occasional gimbaling of the second circular waveguide with respect to the first circular waveguide. The linear waveguides can be assembled from a variety of commercially available or adaptable rigid linear waveguides having a wide range of bend profiles and suitable internal dimensions to accommodate the linearly polarized signals in the target frequency range. In general, rigid linear waveguides can be combined in series to achieve complex bend profiles without significantly impacting insertion loss or signal quality as long as the frequency range of the linearly polarized signals is within a design frequency range of the linear waveguides. Note, however, that except where explicitly contraindicated, alternative structural configurations can be employed together in any suitable combination or arrangement, and that processes for passing circularly polarized signals in one direction for transmission are generally reversible for receiving transmissions and passing the received signals to a signal processing system for decoding. The operation of a communication system using one alternative arrangement as described below with reference to FIG. 10. The method steps in process 1000 of FIG. 10 are described in terms of a circularly polarized signal passed along a circular waveguide. However, it will be understood that the circular waveguide can pass first and second linearly polarized signals as well, including signals having two orthomodes that will be preserved by the adapter. Furthermore, the circular waveguide can be substituted for a square waveguide carrying linearly polarized signals instead of a circularly polarized signal.

FIG. 10 illustrates an example of a second process 1000 for transmitting and receiving data by a satellite communication system employing circularly polarized signals, according to embodiments of the present disclosure. First, the system can cause a transmitter to generate a signal based on stored instructions or stored data, amplify the signal, and convert the signal into a first circularly polarized signal that is then passed into a first circular waveguide. (Act 1001).

The first circular waveguide connects with a first turnstile junction that can generate, from the first circularly polarized signal, a set of linearly polarized signals that are out of phase with respect to each other. (Act 1003). Opposite linearly polarized signals generated in this manner can be merged and passed along common linear waveguides, thus, four linear waveguides can be reduced in practice to as few as two linear waveguides, forming a more compact structure that is simpler to route. (Act 1005).

After the two linearly polarized signals are generated, the signals can be passed along the two linear waveguide from a first location to a second location (Acts 1007), where the two linear waveguides are again separated (Act 1009) and then converge to connect with a second turnstile junction in a similar configuration to their connection with the first turnstile junction (i.e. in the same order, or in some cases in a reversed order). (Act 1011). According to some embodiments, the linear waveguides can be flexible, allowing the linearly polarized with regards to adopt various bends including u-shaped bends and twists that allow for the linear waveguides to adopt almost arbitrary configurations without the bends causing significant degradation of signal quality or generating interference in any major higher-order modes for signals within the frequency band or bands of interest. The linear waveguides have the same common effective length (i.e., the distance "seen" by a signal passing along each of the waveguides). Therefore the linearly polarized signals retain the same offsets in phase with respect to each other at each and of each one of the linear waveguides.

The second circularly polarized signal can be passed directly from the second circular waveguide for transmission by antenna by, e.g., directing the second circularly polarized signal from the second circular waveguide into a feed horn for a transmitter, such as but not limited to a dish transmitter, which can which can have many possible physical configurations and orientations. (Act 1013). In embodiments having flexible linear waveguides, the communication system can accommodate changes in orientation of the feed horn and second circular waveguide with respect to signal processing hardware and the first circular waveguide. (Act 1015).

The second process 1000 is continued in FIG. 10B, in which a third circularly polarized signal in a second band is received at the feed horn resulting in a third circularly polarized signal being passed in reverse along the second circular waveguide. (Act 1017) In the same way that the first circularly polarized signal was divided into a set of linearly polarized signals at the first turnstile junction (FIG. 10A), the second turnstile junction can convert the third circularly polarized signal into a second set of linearly polarized signals by the second turnstile junction. (Act 1019). These linearly polarized signals can be combined using a symmetric power combiner/divider to combine opposing pairs of the second set of linearly polarized signals to generate a second set of two linearly polarized signals. (Act 1021).

Combining subsets of the linearly polarized signals for passing along the linear waveguides provides the advantage of simplifying the routing of the linear waveguides, reducing clutter and weight at the cost of the increased complexity of utilizing sets of symmetric power combiner/dividers. The two linearly polarized signals can be passed along the two linear waveguides from the second turnstile junction toward the first turnstile junction. (Act 1023) The two linearly polarized signals can be separated by an additional symmetric power combiner/divider to regenerate the second set of four linearly polarized signals across four linear waveguides. (Act 1025).

The linearly polarized signals across the four linear waveguides are converged at the first turnstile junction to generate a fourth circularly polarized signal that can be passed along the first circular waveguide, the fourth circularly polarized signal approximating the received third circularly polarized signal. (Act 1027).

Although the fourth circularly polarized signal may be routed directly to the signal processing system, according to some embodiments, the fourth circularly polarized signal can be first filter by a diplexer in line with the first circular waveguide according to a frequency of the fourth circularly polarized signal. (Act 1029). This filtering step can reduce noise and improve the overall functioning of the communication system by preventing interference between signals in disparate frequency bands by connecting the first circular waveguide preferentially with a transmitter across a frequency band reserved for transmissions, and connecting the first circular waveguide preferentially with a receiver across a frequency band reserved for receiving transmissions. This function can operate to prevent received signals from interfering with transmissions. This function can operate in reverse as well, with the diplexer acting to filter transmissions originating from the transmitter to prevent feedback impacting the receiver. The filtered fourth circularly polarized signal can then be processed by the receiver. (Act 1031)

Figure 11:
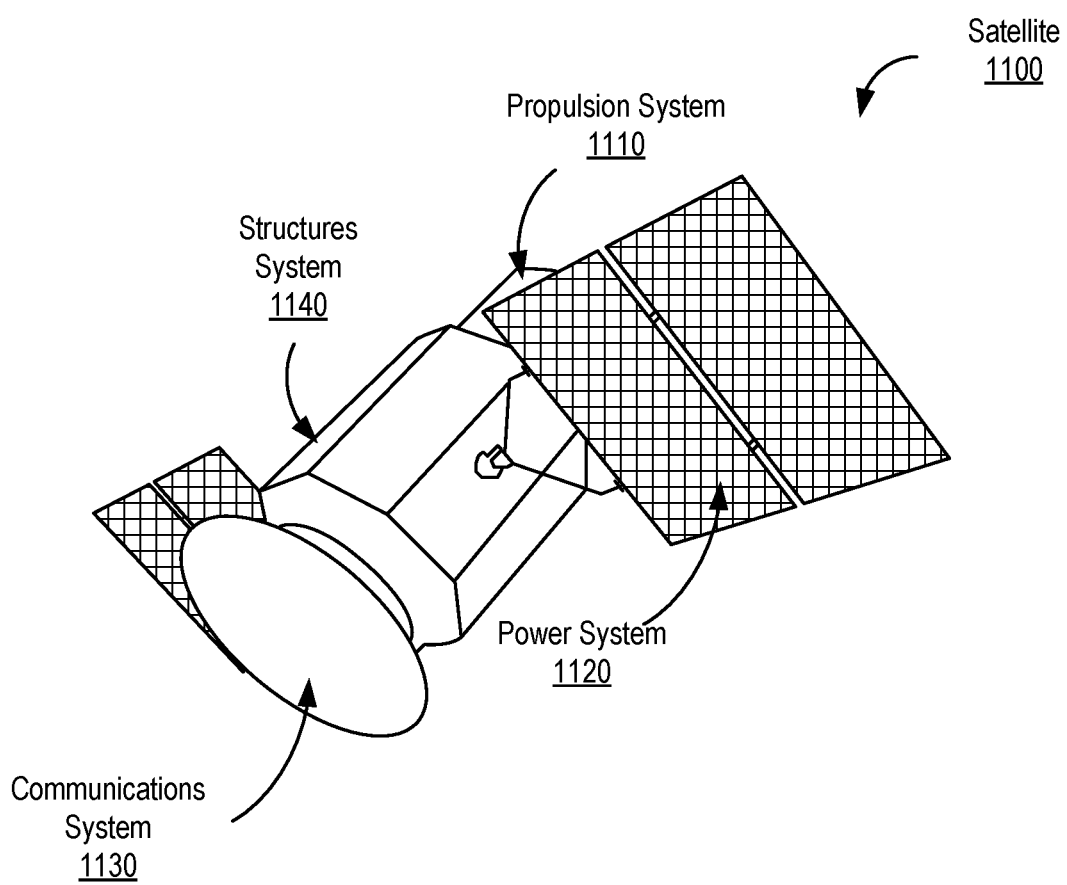
FIG. 11 illustrates an example of components of a satellite, according to embodiments of the present disclosure.

FIG. 11 illustrates an example of components of a satellite 1100, according to embodiments of the present disclosure. The satellite 1100 is an example of the satellite 100 of FIG. 1. As illustrated, the satellite 1100 includes, among other components, a propulsion system 1110, a power system 1120, a communications system 1130, and a structures system 1140.

In an example, the propulsion system 1110 includes one or more motors (e.g., rocket motors) that may move the satellite 1100 in a position within an orbit. The propulsion system 1110 also includes as thrusters to maintain the satellite 1100 in its position. The thrusters can also be used to move the satellite 1100 back into position in the orbit due to, for instance, solar wind or gravitational or magnetic forces.

In an example, the power system 1120 generates electricity from the solar panels deployed on the outside of the satellite 1100. The solar panels also store electricity in a set of storage batteries installed within the structures system 1140. The set of storage batteries can provide power at times when the panels do not receive rays from the sun. The power is used to operate various systems of the satellite 1100, including the communications system 1130.

In an example, the communications system 1130 handles receive and transmit functions. The communications system 1130 receives signals from a source, amplifies them, and transmits them to a destination. The source can be user equipment on the Earth or another satellite. The destination is typically different from the source and includes user equipment on the Earth or another satellite.

In an example, the structures system 1140 provides a stable set of structures so that the satellite 1100 can be kept in position. The structures system 1140 can also house components of other systems, such as subsystems of the power system 1120 (e.g., the storage batteries, power converters, and the like) and subsystems of the communications system 1130 (e.g., receivers, transmitters, and the like). Other components can also be housed within the structures system 1140. For instance, a thermal control system is contained in the structures system 1140. The thermal control system keeps components of the satellite 1100 within their operational temperature ranges. A control system is also contained in the structures system 1140. The control system orients the satellite 1100 precisely to maintain the proper position. When the satellite gets out of position, the control system instructs the propulsion system 1110 to control one or more thrusters to move the satellite 1100 back in position. The control system also includes tracking, telemetry, and control subsystems for monitoring vital operating parameters of the satellite 1100, telemetry circuits for relaying this information to user equipment on the Earth, a system for receiving and interpreting commands sent to the satellite 1100 from the user equipment or another satellite, and a command system for controlling the operation of the satellite 1100.

FIG. 12 illustrates an example of components of systems 1200 of a satellite, according to embodiments of the present disclosure. The satellite can be, e.g. the same as the satellite 100 described with reference to FIG. 1, and can utilize any of the wideband or multiband communication systems described above (e.g. communication system 102, FIG. 1) and may include any of the waveguides adapters described above with reference to any of FIGS. 1-7 for routing circularly polarized signals within the communication systems. As illustrated, the systems 1200 include a communications system 1210, a computer system 1220, a control system 1230, a power system 1240, and a propulsion system 1250.

In an example, the communications system 1210 provides communications with other satellites and/or user equipment such as ground stations. The communications system 1210 can include a set of antennas 1212 and a set of transceivers 1214. The set of antennas 1212 supports radio frequencies within a desired frequency spectrum and can be a phased area of antenna elements. The transceivers 1214 can be components of a transponder of the satellite and can include a set of satellite receivers and a set of satellite transmitters. The satellite transmitter(s) may, for example, multiplex, encode, and compress data to be transmitted, then modulate the data to a desired radio frequency and amplify it for transmission over the set of antennas 1212. Multiple channels can be used, in addition to error correction coding. The satellite receiver(s) demodulates received signals and performs any necessary de-multiplexing, decoding, decompressing, error correction and formatting of the signals from set of antennas 1212, for use by the computer system 1220. The set of antennas 1212 and/or the set of transceivers 1214 may also include switches, filters, low-noise amplifiers, down converters (for example, to an intermediate frequency and/or baseband), and/or other communications components. Data decoded by the satellite receiver(s) can be output to the computer system 1220 for further processing. Conversely, an output of the computer system 1220 can be provided to the satellite transmitter(s) for transmission.

The computer system 1220 can be communicatively coupled with the communications system 1210, the control system 1230, and the power system 1240. In an example, the computer system 1220 provides controls over and/or receives and processes data of the communications system 1210, the control system 1230, and the power system 1240. For instance, the computer system can process communications data of the communications system 1210, outputs attitude and position information to the control system 1230, and outputs power distribution controls to the power system 1240.

In an example, the control system 1230 maintains the satellite in a proper position within an orbit by instructing the propulsion system 1250 to control thrusters and/orient the satellite precisely to maintain the proper position. Maintaining the orbit may also include maintaining the desired nodal separations between itself and the other satellites within the satellite constellation. For instance, the control system 1230 includes tracking, telemetry, and processors for calculating and/or receiving attitude and/or orbit adjustment information.

The power system 1240 provides electrical power to other ones of the systems 1200 including the communications system 1210, the computer system 1220, the control system 1230, and the propulsion system 1250. The power system 1240 may, for example, include one or more solar panels and a supporting frame, and one or more batteries. Telemetry circuits and processors of the power system 1240 can monitor the power collection and the power consumption and can control the collection and the distribution of the electrical power to the other ones of the systems 1200.

The propulsion system 1250 may include a set of motors and set of thrusters. The propulsion system 1250 may also include a set of fuel sources, such as fuel and oxidant tanks, battery cells, liquid fuel rocket, and/or an ion-thruster system. Telemetry circuits and processors of the propulsion system 1250 can control operations of the motors, thrusters, and/or fuel sources to move and/orient the satellite.

In an example, the computer system 1220 (and, similarly, the remaining ones of the systems 1200) includes at least a processor, a memory, a storage device, communication peripherals, and an interface bus. The interface bus is configured to communicate, transmit, and transfer data, controls, and commands among the various components of the computer system 1220. The memory and the storage device include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory and the storage device also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1220.

Further, the memory includes an operating system, programs, and applications. The processor is configured to execute the stored instructions and includes, for example, a logical processing unit, a microprocessor, a digital signal processing system, and other processors. The communication peripherals are configured to facilitate communication between the computer system 1220 and remaining ones of the systems 1200 and include, for example, a communications bus and/or a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A satellite, comprising:
   a satellite frame;
   a signal processing system connected with the satellite frame and comprising a transmitter connected with a processor and memory device containing executable instructions that, when executed by the processor, configure the signal processing system to generate a first circularly polarized signal; and
   a waveguide adapter connected with the satellite frame and arranged to guide the first circularly polarized signal, the waveguide adapter comprising:
     a first circular waveguide connected with the signal processing system configured to receive the first circularly polarized signal, the first circular waveguide disposed along a first axis;
     a first turnstile junction connected with the first circular waveguide, the first turnstile junction comprising a first wave plate assembly configured to convert the first circularly polarized signal into a set of four linearly polarized signals that are offset in phase with respect to each other;
     four linear waveguides operably connected with the first turnstile junction, each one of the four linear waveguides positioned to receive a respective one of the four linearly polarized signals, and each one of the linear waveguides having the same effective length;
     a second turnstile junction operably connected with the four linear waveguides and comprising a second wave plate assembly configured to convert the linearly polarized signals into a second circularly polarized signal that approximates the first circularly polarized signal, each one of the four linear waveguides connected with the first turnstile junction at a first end and connected with the second turnstile junction at a second end; and
     a second circular waveguide connected with the second turnstile junction and configured to receive the second circularly polarized signal, the second circular waveguide being disposed along a second axis that is different from the first axis; and
   an antenna connected with the satellite frame to receive the second circularly polarized signal.

2. The satellite of claim 1, further comprising:
   a feed horn operably connected with the second circular waveguide and positioned to feed the second circularly polarized signal to the antenna.

3. The satellite of claim 2, wherein:
   the feed horn is further configured to receive a third circularly polarized signal via the antenna;
   the signal processing system further comprises a receiver; and
   when the third circularly polarized signal is received by the feed horn:
     the third circularly polarized signal is received, via the feed horn, by the second circular waveguide;
     the third circularly polarized signal is converted by the second wave plate assembly to a second set of four linearly polarized signals;
     each one of the second set of the four linearly polarized signals is fed to the first turnstile junction via a respective one of the four linear waveguides;
     the second set of the four linearly polarized signals are converted by the first wave plate assembly to a fourth circularly polarized signal; and
     the fourth circularly polarized signal is received by the signal processing system via the first circular waveguide.

4. The satellite of claim 1, wherein the set of four linearly polarized signals converted from the first circularly polarized signal have respective phase relationships of 0, 90, 180, and 270 degrees.

5. A waveguide adapter comprising:
   first waveguide;
   a first turnstile junction connected with the first waveguide along a first axis and configured to receive a first signal from the first waveguide and convert the first signal via a first waveguide assembly into a plurality of linearly polarized signals;
   a plurality of linear waveguides connected with the first turnstile junction, each one of the plurality of linear waveguides receiving a respective one of the plurality of linearly polarized signals, and each one of the plurality of linear waveguides having the same effective length;

a second turnstile junction connected with the plurality of linear waveguides, wherein the second turnstile junction converts the plurality of linearly polarized signals via a second waveguide assembly into a second signal; and a second waveguide connected with the second turnstile junction along a second axis and configured to receive the second signal, the second axis being different from the first axis.

6. The waveguide adapter of claim 5, wherein the first waveguide, the second waveguide, and the plurality of linear waveguides are all configured to carry electromagnetic signals having frequencies in a range from about 17.7 GHz to about 30 GHz, with an average insertion loss between the first signal and the second signal of less than 0.2 dB.

7. The waveguide adapter of claim 5, wherein:
the plurality of linear waveguides comprise four linear waveguides and the plurality of linearly polarized signals comprise four linearly polarized signals having respective phase differences of 0, 90, 180, and 270 degrees; and
the four linear waveguides diverge from the first turnstile junction orthogonally with respect to each other and with respect to the first waveguide, and converge at the second turnstile junction orthogonally with respect to each other and with respect to the second waveguide.

8. The waveguide adapter of claim 7, wherein:
the first signal and the second signal are circularly polarized; and
the four linear waveguides are connected with the first turnstile junction sequentially about the first turnstile junction according to a first sequence and connected sequentially around the second turnstile junction according to the first sequence, such that a handedness of the first signal is preserved in the second signal or according to a second sequence that is reversed relative to the first sequence, such that the handedness of the first signal is reversed in the second signal.

9. The waveguide adapter of claim 5, further comprising a diplexer connected with the first waveguide and configured to isolate received signals in a receiving band from transmitted signals in a transmitting band separate from the receiving band.

10. The waveguide adapter of claim 5, wherein the plurality of linear waveguides are flexible, and wherein the second waveguide and the second turnstile junction are movable with respect to the first waveguide and the first turnstile junction.

11. The waveguide adapter of claim 5, wherein the linear waveguides are rigid and comprise rectangular waveguides, single ridged waveguides, double ridged waveguides, or groove gap waveguides.

12. The waveguide adapter of claim 5, wherein the first waveguide assembly comprises a plurality of quarter-wave plates, each one of the quarter-wave plates aligned with a respective one of the plurality of linear waveguides and configured to generate a respective one of the plurality of linearly polarized signals from the first signal.

13. The waveguide adapter of claim 5, wherein:
the plurality of linear waveguides comprises a first subset of two linear waveguides connected with the first turnstile junction;
the first subset of two linear waveguides are connected with a singular linear waveguide by a symmetric power combiner; and
the singular linear waveguides is connected to a second subset of two linear waveguides by a symmetric power divider, the second subset of two linear waveguides connected with the second turnstile junction.

14. The waveguide adapter of claim 5, wherein the first waveguide assembly comprises a wave plate assembly configured to convert the first signal into the plurality of linearly polarized signals that are offset in phase with respect to each other.

15. The waveguide adapter of claim 14, wherein the plurality of linearly polarized signals are offset in phase by a quarter wavelength with respect to each other.

16. The waveguide adapter of claim 14, wherein the wave plate assembly comprises a plurality of wave plates, each one of the wave plates aligned with a respective one of the plurality of linear waveguides.

17. A method, comprising:
passing a first signal along a first waveguide;
converting the first signal into a set of linearly polarized signals via a first waveplate assembly in a first turnstile junction that is connected with the first waveguide along a first axis;
passing each one of the set of linearly polarized signals from the first turnstile junction to a second turnstile junction along a respective linear waveguide of a set of linear waveguides having the same effective length;
converting the set of linearly polarized signals into a second signal that approximates the first signal via a second waveplate assembly in the second turnstile junction; and
passing the second signal from the second turnstile junction along a second waveguide that is connected with the second turnstile junction along a second axis, the second axis being different from the first axis.

18. The method of claim 17, wherein the first and second waveguides are circular waveguides configured to pass circularly polarized signals, and each one of the linear waveguides comprises bends, such that the passing each one of the linearly polarized signals comprises redirecting the linearly polarized signals by the linear waveguides.

19. The method of claim 17, further comprising:
passing a third signal along the second waveguide to the second turnstile junction;
converting the third signal into a second set of linearly polarized signals via the second waveplate assembly in the second turnstile junction;
passing each one of the second set of linearly polarized signals from the second turnstile junction to the first turnstile junction by the linear waveguides;
converting the second set of linearly polarized signals into a fourth signal that approximates the third signal by combining the second set of linearly polarized signals via the first waveplate assembly in the first turnstile junction; and
passing the fourth signal along the first waveguide.

20. The method of claim 17, further comprising:
changing an orientation of the second waveguide with respect to the first waveguide, without bending the first waveguide or the second waveguide, with bending of the linear waveguides.

\* \* \* \* \*